(12) United States Patent
Yamamoto et al.

(10) Patent No.: US 6,458,901 B1
(45) Date of Patent: Oct. 1, 2002

(54) PROPYLENIC COPOLYMER AND THERMOPLASTIC RESIN COMPOSITION

(75) Inventors: Keisaku Yamamoto; Hirofumi Johoji; Hidetake Hozumi, all of Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/554,316

(22) PCT Filed: Nov. 11, 1998

(86) PCT No.: PCT/JP98/05070

§ 371 (c)(1),
(2), (4) Date: May 12, 2000

(87) PCT Pub. No.: WO99/24482

PCT Pub. Date: May 20, 1999

(30) Foreign Application Priority Data

Dec. 11, 1997 (JP) .............................................. 9-310233

(51) Int. Cl.[7] .................................................. C08F 4/06
(52) U.S. Cl. ....................... 526/113; 526/132; 526/133; 526/134; 526/159; 526/160; 526/348.2; 526/348.5; 526/348.6; 526/280
(58) Field of Search ................................. 526/113, 132, 526/133, 134, 159, 160, 348.2, 348.5, 348.6, 280

(56) References Cited

U.S. PATENT DOCUMENTS 5,444,145 A * 8/1995 Brant et al. .............. 526/348.3

FOREIGN PATENT DOCUMENTS

| JP | A 9-132683 | 5/1997 |
| JP | A 9-151283 | 6/1997 |
| JP | A 10-72505 | 3/1998 |
| WO | WO 00/22014 | 4/2000 |

* cited by examiner

Primary Examiner—David W. Wu
Assistant Examiner—William K Cheung
(74) Attorney, Agent, or Firm—Birch, Stewart, Kolasch & Birch, LLP

(57) ABSTRACT

A propylene copolymer comprising propylene, at least one olefin selected from the group consisting of olefins having 2 to 20 carbon atoms except propylene, and a cyclic olefin, wherein the total number of carbon atoms of the monomers except the cyclic olefin is at least 7. This copolymer is mixed with a thermoplastic resin such as polypropylene to provide a thermoplastic resin composition having excellent flexibility, transparency, resistance to whitening on bending, scratch resistance and heat resistance.

22 Claims, No Drawings

PROPYLENIC COPOLYMER AND THERMOPLASTIC RESIN COMPOSITION

This application is the national phase under 35 U.S.C. § 371 of PCT International Application No. PCT/JP98/05070 which has an International filing date of Nov. 11, 1998, which designated the United States of America.

FIELD OF THE INVENTION

The present invention relates to a propylene copolymer and a thermoplastic resin composition. In particular, the present invention relates to a novel propylene copolymer, which is mixed with a thermoplastic resin such as polypropylene to provide a thermoplastic resin composition having excellent flexibility, transparency, resistance to whitening on bending, scratch resistance and heat resistance, and to a thermoplastic resin composition comprising such a propylene copolymer and a thermoplastic resin.

BACKGROUND ART

Ethylene-propylene-non-conjugated diene copolymers (EPDM) have good ozone resistance, weather resistance, heat-aging resistance, chemical resistance, etc., since they have no double bond in their backbones, and thus they are widely used in crosslinking rubber applications or resin modifier applications. In particular, in the resin modifier applications, it is known to produce a thermoplastic resin having good tensile properties, compression set and impact resistance by finely dispersing EPDM in a resin matrix by a dynamic crosslinking method comprising blending EPDM in the resin matrix, and kneading them with a crosslinking agent to crosslink EPDM. Recently, the demand for the use of polyolefin materials increases also in the fields where soft vinyl chloride resins have been used. In such fields, the higher performances are required with regard to flexibility, heat resistance, scratch resistance and transparency. However, the polyolefin materials comprising EPDM may not always reach the required levels of such properties.

To deal with the environmental pollution issues, the demand for substitute materials for soft vinyl chloride resins increases in the applications where the soft vinyl chloride resins have been used. With such a background, there are proposed a thermoplastic resin composition having good flexibility, transparency, mechanical strength, resistance to whitening, cold resistance, etc., which is prepared by blending a specific hydrogenated conjugated diene-styrene copolymer with a thermoplastic resin such as polypropylene (JP-A-6-57087, JP-A-6-271717, etc.), and a thermoplastic resin composition having good flexibility, transparency, mechanical strength, resistance to whitening and cold resistance, which contains a crystalline polypropylene resin and an ethylene-a-olefin copolymer as a soften material consisting of olefinic components (JP-A-7-102126, etc.)

The latter composition may be a material having the properties relatively close to the required levels as a substitute material for the soft vinyl chloride resins among olefinic materials containing neither chlorine nor aromatic vinyl compounds. However, this composition has a problem, that is, the surface tackiness due to the ethylene-α-olefin copolymer, as described in JP-A-8-301927, and has not been practically used.

To improve such tackiness, JP-A-8-301927 and JP-A-9-104720 proposed a method for crosslinking an ethylene-α-olefin copolymer with electron beams or peroxide compounds. However, such a method is not still satisfactory.

Under such circumstances, the present inventors have proposed a propylene copolymer comprising propylene-α-olefin, or propylene-α-olefin-ethylene as a novel material which is advantageously used in the production of olefinic soft materials (Japanese Patent Application Nos. 9-312036 and 10-190256). However, molded products of a resin composition comprising such a propylene copolymer have surface tackiness in the practical property test, in particular, the high-temperature accelerated weathering test. Thus, such a resin composition does not have sufficient properties for the use in applications requiring heat resistance, for example, automobile interior applications which may encounter high-temperature environments.

SUMMARY OF THE INVENTION

In view of such prior arts, the present inventors have made extensive study on propylene copolymers, and found that a material comprising a novel propylene copolymer as a modifier has better flexibility, transparency, resistance to whitening on bending and scratch resistance than the conventional thermoplastic resin compositions comprising EPDM as a modifier, and that the tackiness, which is the problem under the specific application conditions in the prior art, can be improved by the use of a novel propylene copolymer.

One object of the present invention is to provide a novel propylene copolymer which is mixed with a thermoplastic resin such as polypropylene to provide a thermoplastic resin composition having excellent flexibility, transparency, resistance to whitening on bending, scratch resistance and heat resistance.

Another object of the present invention is to provide a novel propylene copolymer, which can improve the tackiness that is the problem under the specific application conditions in the prior art, when it is used as a modifier of a thermoplastic resin.

According to the first aspect of the present invention, there is provided a propylene copolymer comprising propylene, at least one olefin selected from the group consisting of olefins having 2 to 20 carbon atoms except propylene, and a cyclic olefin, wherein the total number of carbon atoms of the monomers except the cyclic olefin is at least 7 (hereinafter referred to as the first invention).

According to the second aspect of the present invention, there is provide an additive for a thermoplastic resin composition, comprising the propylene copolymer of the first invention.

According to the third aspect of the present invention, there is provided a thermoplastic resin composition comprising the propylene copolymer of the firs invention and a thermoplastic resin.

DETAILED DESCRIPTION OF THE INVENTION

The propylene copolymer of the present invention comprises propylene, at least one olefin selected from the group consisting of olefins having 2 to 20 carbon atoms except propylene, and a cyclic olefin, and is characterized in that the total number of carbon atoms of the monomers except the cyclic olefin is at least 7.

Examples of the olefins having 2 to 20 carbon atoms except propylene include an olefin of the formula [IV]:

[IV]

wherein $R_1$ is a hydrogen atom or a linear or branched alkyl group having 2 to 18 carbon atoms.

Specific examples of such olefins include ethylene; linear olefins such as 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, etc.; and branched olefins such as 3-methyl-1-butene, 3-methyl-1-pentene, -1-4-methyl-1-pentene, 2-ethyl-1-hexene, 2,2,4-trimethyl-1-pentene, etc.

Examples of the combinations of olefins in which the total number of the carbon atoms of the monomers except the cyclic olefin is at least 7 include propylene/1-butene, propylene/1-hexene, propylene/1-octene, propylene/1-butene/1-hexene, propylene/1-butene/1-octene, propylene/1-butene/1-hexene/1-octene, propylene/1-butene/ethylene, propylene/1-hexene/ethylene, propylene/1-octene/ethylene, propylene/1-butene/1-hexene/ethylene, propylene/1-butene/1-octene/ethylene, propylene/1-butene/1-hexene/1-octene/ ethylene, and the like.

The cyclic olefin to be used in the propylene copolymer of the present invention is a cyclic compound having at least one ring with at least 4 carbon atoms, and at least one double bond in the molecules which may optionally be substituted with various substituents. A specific example of such a cyclic olefin is a compound of the formula [V] or [VI]:

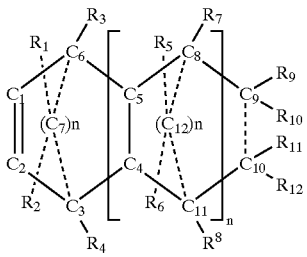

[VI]

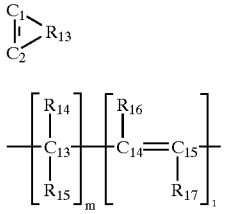

[VII]

wherein n, m and 1 are each an integer of 0 or larger; $C_1$ to $C_{15}$ are carbon atoms, and $C_1$ and $C_2$ forms a polymerizable double bond; $R_1$ to $R_{12}$ and $R_{14}$ to $R_{17}$ represent independently each other a hydrogen atom, a halogen atom, a hydroxyl group, an amino group or an organic group having 1 to 20 carbon atoms; $C_3$ and $C_6$, and $C_8$ and $C_{11}$ in the formula [V] may be bonded through $(C_7)_n$ and $(C_{12})_n$, respectively;

$R_9$ and $R_{10}$ and $R_{11}$ and $R_{12}$ may form a ring through a residue of the formula [VII]; the compound of the formula [VI] has a cyclic structure with $R_{13}$ being the residue of the formula [VII], provided that m and 1 in the formula [VII] are selected from integers of 0 or larger so that the number of carbon atoms in the cyclic olefin is at least 4.

Specific examples of the organic group having 1 to 20 carbon atoms, which is one of the substituents, include alkyl groups such as a methyl group, an ethyl group, a propyl group, a butyl group, a hexyl group, an octyl group, a dodecyl group, etc; aryl groups such as a phenyl group, a tolyl group, a naphthyl group, etc.; aralkyl groups such as a benzyl group, a phenethyl group, etc.; alkylidene groups such as a methylidene group, an ethylidene group, etc.; alkenyl groups such as a vinyl group, an allyl group, etc.; alkoxy groups such as a methoxy group, an ethoxy group, etc.; aryloxy groups such as a phenoxy group, etc.; acyl groups such as an acetyl group, etc.; alkoxycarbonyl groups such as a methoxycarbonyl group, an ethoxycarbonyl group, etc.; acyloxy groups such as an acetyloxy group, etc.; optionally substituted silyl groups such as a trimethylsilyl group, etc.; and the above alkyl, aryl and aralkyl groups a part of the hydrogen atoms of which are substituted with a halogen atom, a hydroxyl group, an amino group, an acyl groups, a carboxyl group, an alkoxy group, an alkoxycarbonyl group, an acyloxy group, an optionally substituted silyl group, an alkylamino group or a cyano group.

Specific examples of the cyclic olefin of the formula [V] include norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4, 4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-etylidene-1,4,5,8-dimethano-1,2,3, 4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2, 3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxynorbornene anhydrate, 5-dimethylaminonorbornene, 5-cyanonorbornene, etc.

Specific examples of the cyclic olefin of the formula [VI] include cyclopenetene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene, etc.

Specific examples of the cyclic polyene having two carbon-carbon double bonds in the cyclic olefin molecule, which is represented by the formula [V] include 5-ethylidene-2-norbornene, 5-methylene-2-norbornene, 5-isopropylidene-2-norbornene, 3-vinylcyclohexene, 4-vinylcyclohexene, 5-vinylnorbornene, 5-allylnorbornene, 5,6-diethylidene-2-norbornene, dicyclopenadiene, dimethylcyclopentadiene, 2,5-norbornadiene, etc.

Specific examples of the cyclic polyene compound of the formula [VI] include 1,3-cyclopentadiene, 1,3-cyclohexadiene, 1,4-cyclohexadiene, 5-ethyl-1,3-cyclohexadiene, 1,3-cycloheptadiene, 1,3-cyclooctadiene, etc.

When no cyclic olefin is contained, the thermoplastic resin composition has low heat resistance.

The propylene copolymer of the present invention preferably contains 0.01 to 20% by mole, more preferably 0.05 to 15% by mole, particularly preferably 0.1 to 10% by mole, most preferably 0.15 to 5% by mole, of the cyclic olefin. When the amount of the cyclic olefin in the propylene copolymer is too low, the thermoplastic resin composition may have low heat resistance. When the amount of the cyclic olefin in the propylene copolymer is too large, the thermoplastic resin composition may have low impact resistance at low temperature, or low flexibility.

When the propylene copolymer of the present invention comprises ethylene (the olefin having two carbon atoms), the content of ethylene is preferably 80% by mole or less, more preferably 70% by mole or less, particularly preferably 60% by mole or less, most preferably 50% by mole or less, from the viewpoint of the improvement of flexibility of the thermoplastic resin composition. When the ethylene content is outside the above range, the propylene copolymer may contain crystals due to ethylene, and in turn the thermoplastic resin composition may have low flexibility, transparency, resistance to whitening on bending or scratch resistance.

When the propylene copolymer of the present invention comprises ethylene, it preferably satisfies the following relationship:

$$[y/(x+y)] \geq 0.2,$$

more preferably $$[y/(x+y)] \geq 0.3,$$

particularly preferably $$[y/(x+y)] \geq 0.4,$$

most preferably $$[y/(x+y)] \geq 0.5$$

wherein x is the molar content of ethylene in the copolymer, and y is the molar content of olefins having 4 to 20 carbon atoms in the copolymer.

When the propylene copolymer does not satisfy the above relationship, the thermoplastic resin composition may have low flexibility, transparency, resistance to whitening on bending or scratch resistance.

In particular, when the low temperature resistance is required, the propylene content in the propylene copolymer of the present invention is generally 90% by mole or less, preferably 80% by mole or less, more preferably 70% by mole or less, particularly preferably 60% by mole or less, most preferably 50% by mole or less.

When the propylene content is outside the above range, the thermoplastic resin composition may have low impact resistance at low temperature.

The olefin (other than propylene) contained in the propylene copolymer of the present invention has 2 carbon atoms or 4 to 20 carbon atoms, and is preferably ethylene, 1-butene, 1-hexene, 1-octene or 1-decene.

An intrinsic viscosity [η] of the propylene copolymer of the present invention is preferably from 0.3 to 10, more preferably from 0.5 to 7, most preferably from 0.7 to 5, when measured in Tetralin (tetrahydronaphthalene) at 135° C. When the intrinsic viscosity is too low, the thermoplastic resin composition may have low scratch resistance. When the intrinsic viscosity is too high, the thermoplastic resin composition may have low flexibility.

The intrinsic viscosity [η] is measured using a Ubbellohde viscometer in Tetralin at 135° C. Three hundred grams of a copolymer sample is dissolved in 100 ml of Tetralin to obtain a solution having a concentration of 3 mg/ml. Then, this solution is diluted to decrease the concentration to ½, ⅓ or ⅕, and a viscosity of each solution is measured in a constant temperature vessel kept at 135° C.±0.1° C. At each concentration, the viscosity is measured three times, and the averaged value is used as an intrinsic viscosity.

The propylene copolymer of the present invention preferably has a molecular weight distribution (Mw/Mn) of 5 or less, more preferably 4 or less, most preferably 3 or less, when measured by gel permeation chromatography (GPC). When the molecular weight distribution is too broad, the thermoplastic resin composition may have low scratch resistance, when such a copolymer is used as a modifier.

A molecular weight distribution is measured by a gel permeation chromatography (GPC) method using, for example, a 150C/GPC apparatus of Waters, Inc. An elution temperature is 140° C., a used column is, for example, Sodex Packed Column A-80 manufactured by SHOWA DENKO Kabushikikaisha, and standard samples for molecular weights are polystyrenes, for example, polystyrenes having molecular weights of 68 to 8,400,000 manufactured by TOSOH CORPORATION.

About 5 mg of a polymer is dissolved in 5 ml of o-dichlorobenzene to obtain a solution having a concentration of about 1 mg/ml. The obtained sample solution (400 μl) is injected in the column. A flow rate of an eluting solvent is 1.0 ml/min., and the eluted fractions are detected with a refractive index detector.

Then, a ratio of the measured weight average molecular weight (Mw) to the measured number average molecular weight (Mn), which are both polystyrene-converted molecular weights, is calculated, and used as a molecular weight distribution of the propylene copolymer of the present invention.

Preferably, the propylene copolymer of the present invention has neither a peak of 1 J/g or more due to the melting of crystals nor a peak of 1 J/g or more due to crystallization, in the measurement with a differential scanning calorimeter (DSC) If a propylene copolymer has such a peak, the thermoplastic resin composition may have low flexibility, transparency, resistance to whitening on bending or scratch resistance. Herein, DSC 220C of Seiko Electronic Industries, Ltd. is used as a differential scanning calorimeter, and the measurement is carried out at a temperature raising or decreasing rate of 10° C./min.

When the propylene copolymer of the present invention is used as a modifier of a thermoplastic resin in an amount of 70% by weight or less of the thermoplastic resin composition, a flexural modulus (U) of the thermoplastic resin composition preferably satisfies the following relationship:

$$U \leq 1.5 \times S \times (T/100)^{3.3},$$

more preferably $$U \leq 1.4 \times S \times (T/100)^{3.3},$$

particularly preferably $$U \leq 1.3 \times S \times (T/100)^{3.3},$$

most preferably $$U \leq 1.2 \times S \times (T/100)^{3.3}$$

wherein S is a flexural modulus (kgf/cm$^2$) of the thermoplastic resin, and T is a content (% by weight) of the thermoplastic resin in the thermoplastic resin composition.

When the flexural modulus is outside the above range, the thermoplastic resin composition may have low flexibility, transparency, resistance to whitening on bending or scratch resistance.

When the propylene copolymer of the present invention is used as a modifier of a thermoplastic resin, preferably the surface condition of the thermoplastic resin composition is not deteriorated in a heat test carried out at a temperature lower than the melting point of the thermoplastic resin. Herein, the deterioration of the surface condition means the generation of gloss on a matted surface of a molded sample, and so on.

When the propylene copolymer of the present invention is used as a modifier of a thermoplastic resin in an amount of 50% by weight or less of the thermoplastic resin composition, a heat deformation resistant temperature J (°C.) of the thermoplastic resin composition preferably satisfies the following relationship:

$J \geq K-50$, more preferably $J \geq K-40$, particularly preferably $J \geq K-30$, most preferably $J \geq K-20$ wherein K is a heat deformation resistant temperature (°C.) of the thermoplastic resin.

For example, a heat deformation resistant temperature can be measured as follows:

A molded sheet having a length of 140 mm, a width of 30 mm and a thickness of 0.5 mm is supplied, and its upper edge of 25 mm is fixed to a jig, while its lower edge of 25 mm is fixed to another jig for loading a weight of 10 g on the sheet. Then, the sheet is suspended in an oven which is maintained at a constant temperature. After heating for 1 hour, the elongation or breakage of the unfixed part (90 mm) of the sheet is checked. When neither elongation nor breakage is observed in the sheet sample after 1 hour heating, the temperature of the oven was raised by 5° C., and the above test is repeated. The highest temperature at which neither elongation nor breakage is observed is adopted as a heat deformation resistant temperature. The detailed procedures of the above test are the same as those defined by TOKYO-TO ACT No. 1027, except that the sheet thickness is 0.5 mm in the above test.

The propylene copolymer of the present invention can be prepared using known Ziegler-Natta catalysts or metallocene catslyts. Among others, the metallocene catalysts are preferable since they can produce propylene copolymers having a high molecular weight, a narrow molecular weight distribution, and a narrow composition distribution. Examples of the metallocene catalysts are those described in JP-A-9-12635 and JP-A-9-151205.

In particular, propylene copolymers prepared by copolymerizing propylene, at least one olefin selected from the group consisting of olefins having 2 to 20 carbon atoms except propylene, and a cyclic olefin in the presence of an olefin-polymerization catalyst comprising the following component (A), and one or both of the following components (B) and (C):

(A) at least one transition metal complex selected from the group consisting of the compounds represented by the following formulas [I], [II] and [III]:

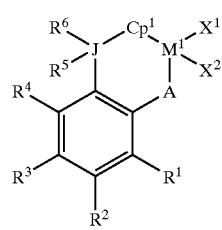

[I]

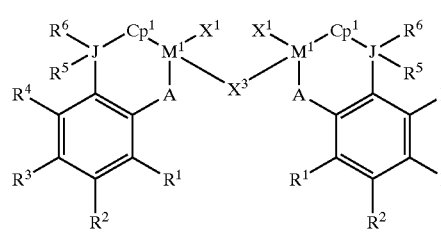

[II]

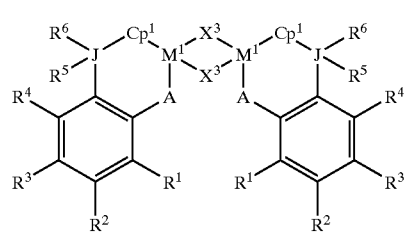

[III]

wherein $M^1$ is a transition metal element of the 4 group of the Periodic Table, A is an element of the 16 group of the Periodic Table, J is an element of the 14 group of the Periodic Table; $Cp^1$ is a cyclopentadienyl anionic moiety; $X^1$, $X^2$, $R^1$, $R^2$, $R^3$, $R^4$, $R^5$ and $R^6$ represent independently each other a hydrogen atom, a halogen atom, an alkyl group, an aralkyl group, an aryl group, a substituted silyl group, an alkoxy group, an aralkyloxy group, an aryloxy group or a di-substituted amino group, provided that $R^1$, $R^2$, $R^3$, $R^4$, $R^5$ and $R^6$ may optionally be bonded to form a ring; and $X^3$ is an element of the 16 group of the Periodic Table; provided that two $M^1$, A, J, $Cp^1$, $X^1$, $X^2$, $X^3$, $R^1$, $R^2$, $R^3$, $R^4$, $R^5$ or $R^6$ in the formula [I] or [II] may be the same or different.

(B) at least one aluminum compound selected from the group consisting of the following compounds (B1), (B2) and (B3):

(B1) an organic aluminum compound of the formula:

(B2) a cyclic aluminoxane of the formula:

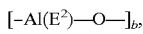

and (B3) a linear aluminoxane of the formula:

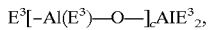

wherein $E^1$, $E^2$ and $E^3$ represent independently each other a hydrocarbon group, provided that all $E^1$'s, all $E^2$'s and all $E^3$'s may be the same or different; Z is a hydrogen atom or a halogen atom, provided that all Z's may be the same or different; a is a number which satisfies the formula: $0<a\leq3$, b is an integer of 2 or more; and c is an integer of 1 or more.

(C) at least one boron compound selected from the group consisting of the following compounds (C1), (C2) and (C3):

(C1) a boron compound of the formula: $BQ^1Q^2Q^3$, (C2) a boron compound of the formula: $G^+(BQ^1Q^2Q^3Q^4)^-$, and (C3) a boron compound of the formula: $(L—H)^+$ $(BQ^1Q^2Q^3Q^4)^-$ wherein B is a trivalent boron atom, $Q^1$, $Q^2$, $Q^3$ and $Q^4$ represent independently each other a halogen atom, a hydrocarbon group, a halohydrocarbon group, a substituted silyl group, an alkoxy group or a di-substituted amino group, and they may be the same or different, $G^+$ is an organic or inorganic cation, L is a neutral Lewis base, $(L—H)^+$ is a Brønsted acid.

Hereinafter, the components (A), (B) and (C) are explained in detail.

(A) Transition Metal Complexes

The transition metal complex (A) is represented by the above formula [I], [II] or [III].

In the formula [I], [II] or [III], the transition metal atom $M^1$ means a transition metal element of the 4 group of the Periodic Table (IUPAC, Nomenclature of Inorganic Chemistry, Revised Edition, 1989). Examples of the transition metal element of the 4 group include a titanium atom, a zirconium atom, a hafnium atom, etc. Among them, a titanium atom and a zirconium atom are preferable.

Examples of the element of the 16 group of the Periodic Table, which is represented by the symbol A in the formula [I], [II] or [III], include an oxygen atom, a sulfur atom, a selenium atom, etc. Among them, an oxygen atom is preferable.

Examples of the element of the 14 group of the Periodic Table, which is represented by the symbol J in the formula [I], [II] or [III], include a carbon atom, a silicon atom, a germanium atom, etc. Among them, a carbon atom and a silicon atom are preferable.

Examples of the cyclopentadienyl anionic moiety represented by the substituent $Cp^1$ include $\eta^5$-(substituted) cyclopentadienyl groups, $\eta^5$-(substituted)indenyl group, $\eta^5$-(substituted)fluorenyl group, etc. Specific examples of those groups are as follows:

a $\eta^5$-cyclopentadienyl group, a $\eta^5$-methylcyclopentadienyl group, a $\eta^5$-dimethylcyclopentadienyl group, a $\eta^5$-trimethylcyclopentadienyl group, a $\eta^5$-tetramethylcyclopentadienyl group, a $\eta^5$-ethylcyclopentadienyl group, a $\eta^5$-n-proyplcyclopentadienyl group, a $\eta^5$-isoproylcyclopentadienyl group, a $\eta^5$-n-butylcyclopentadienyl group, a $\eta^5$-sec.-butylcyclopentadienyl group, a $\eta^5$-tert.-butylcyclopentadienyl group, an5-n-pentylcyclopentadienyl group, a $\eta^5$-neopentylcyclopentadienyl group, a $\eta^5$-n-hexylcyclopentadienyl group, a $\eta^5$-n-octylcyclopentadienyl group, a $\eta^5$-phenylcyclopentadienyl group, a $\eta^5$-naphthylcyclopentadienyl group, a $\eta^5$-trimethylsilylcyclopentadienyl group, a $\eta^5$-triethylsilylcyclopentadienyl group, a $\eta^5$-tert.-butyldimethylsilylcyclopentadienyl group, a $\eta^5$-indenyl group, a $\eta^5$-methylindenyl group, a $\eta^5$-dimethylindenyl group, a $\eta^5$-ethylindenyl group, a $\eta^5$-n-propylindenyl group, a $\eta^5$-isopropylindenyl group, a $\eta^5$-n-butylindenyl group, a $\eta^5$-sec.-butylindenyl group, a $\eta^5$-tert.-butylindenyl group, a $\eta^5$-pentylindenyl group, a $\eta^5$-neopentylindenyl group, a $\eta^5$-n-hexylindenyl group, a $\eta^5$-octylindenyl group, a $\eta^5$-n-decylindenyl group, $\eta^5$-phenylindenyl group, a $\eta^5$-methylphenylindenyl group, a $\eta^5$-naphthylindenyl group, a $\eta^5$-trimethylsilylindenyl group, a $\eta^5$-triethylsilylindenyl group, a $\eta^5$-tert.-butyldimethylsilylindenyl group, a $\eta^5$-tetrahydroindenyl group, a $\eta^5$-fluorenyl group, a $\eta^5$-methylfluorenyl group, a $\eta^5$-dimethylfluorenyl group, a $\eta^5$-ethylfluorenyl group, a $\eta^5$-diethylfluorenyl group, a $\eta^5$-n-propylfluorenyl group, a $\eta^5$-di-n-propylfluorenyl group, a $\eta^5$-isopropylfluorenyl group, a $\eta^5$-diisopropylfluorenyl group, a $\eta^5$-n-butylfluorenyl group, a $\eta^5$-sec.-butylfluorenyl group, a $\eta^5$-tert.-butylfluorenyl group, a $\eta^5$-di-n-butylfluorenyl group, a $\eta^5$-di-sec.-butylfluorenyl group, a $\eta^5$-di-tert.-butylfluorenyl group, a $\eta^5$-n-pentylfluorenyl group, a $\eta^5$-neopentylfluorenyl group, a $\eta^5$-n-hexylfluorenyl group, a $\eta^5$-n-octylfluorenyl group, a $\eta^5$-decylfluorenyl group, a $\eta^5$-n-dodecylfluorenyl group, a $\eta^5$-phenylfluorenyl group, a $\eta^5$-diphenylfluorenyl group, a $\eta^5$-methylphenylfluorenyl group, a $\eta^5$-naphthylfluorenyl group, a $\eta^5$-trimethylsilylfluorenyl group, a $\eta^5$-bis-trimethylsilylfluorenyl group, a $\eta^5$-triethylsilylfluorenyl group, a $\eta^5$-tert.-butyldimethylsilylfluorenyl group, etc. Among them, a $\eta^5$-cyclopentadienyl group, a $\eta^5$-methylcyclopentadienyl group, a $\eta^5$-tert.-butylcyclopentadienyl group, a $\eta^5$-tetramethylcyclopentadienyl group, a $\eta^5$-indenyl group and a $\eta^{55}$-fluorenyl group are preferable.

Examples of the halogen atom for $X^1$, $X^2$, $R^1$, $R^2$, $R^3$, $R^4$, $R^5$ and $R^6$ are a fluorine atom, a chlorine atom, a bromine atom and an iodine atom. Among them, a chlorine atom or a bromine atom, in particular, a chlorine atom is preferable.

Examples of the alkyl group for $X^1$, $X^2$, $R^1$, $R^2$, $R^3$, $R^4$, $R^5$ and $R^6$ are alkyl groups having 1 to 20 carbon atoms. Specific examples of the alkyl groups include a methyl group, an ethyl group, a n-propyl group, an isoproyl group, a n-butyl group, a sec.-butyl group, a tert.-butyl group, a n-pentyl group, a neopentyl group, an amyl group, a n-hexyl group, a n-octyl group, a n-decyl group, a n-dodecyl group, a n-pentadecyl group, a n-eicosil group, etc. Among them, a methyl group, an ethyl group, an isopropyl group, a tert.-butyl group and an amyl group are preferable.

Such alkyl groups may be substituted with one or more halogen atoms such as fluorine atoms, chlorine atoms, bromine atoms or iodine atoms. Specific examples of $C_1$–$C_{20}$ alkyl groups substituted with a halogen atom or halogen atoms include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoetyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, a bromoeicosyl group, etc.

The above alkyl groups may be substituted with one or more alkoxy groups such as methoxy groups, ethoxy groups, etc.; one or more aryloxy groups such as phenoxy groups; or one or more aralkyloxy groups such as benzyloxy groups.

Examples of the aralkyl group for $X^1$, $X^2$, $R^1$, $R^2$, $R^3$, $R^4$ $R^5$ and $R^6$ are preferably aralkyl groups having 7 to 20 carbon atoms. Examples of such aralkyl groups include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl) methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl) methyl group, a (n-propylphenyl)methyl group, a (isopropylphenyl)methyl group, a (n-butylphenyl)methyl group, a (sec.-butylphenyl) methyl group, a (tert.-butylphenyl)methyl group, a (n-pentylphenyl)methyl group, a (neopentylphenyl) methyl group, a (n-hexylphenyl) methyl group, a (n-octylphenyl) methyl group, a (n-decylphenyl)methyl group, a (n-dodecylphenyl)methyl group, a (n-tetradecylphenyl) methyl group, a naphthylmethyl group, an anthracenylmethyl group, etc. Among them, a benzyl group is preferable.

Those aralkyl groups may be substituted with one or more halogen atoms such as fluorine atoms, chlorine atoms, bromine atoms or iodine atoms.; one or more alkoxy groups such as methoxy groups, ethoxy groups, etc.; one or more aryloxy groups such as phenoxy groups; or one or more aralkyloxy groups such as benzyloxy groups.

Examples of the aryl group for $X^1$, $X^2$, $R^1$, $R^2$, $R^{31}$ $R^4$, $R^5$ and $R^6$ are preferably aryl groups having 6 to 20 carbon atoms. Specific examples of such aryl groups include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec.-butylphenyl group, a tert.-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, an anthracenyl group, etc. Among them, a phenyl group is preferable.

Those aryl groups may be substituted with one or more halogen atoms such as fluorine atoms, chlorine atoms, bromine atoms or iodine atoms; one or more alkoxy groups such as methoxy groups, ethoxy groups, etc.; one or more aryloxy groups such as phenoxy groups; or one or more aralkyloxy groups such as benzyloxy groups.

Examples of the substituted silyl group for $X^1$, $X^2$, $R^1$, $R^2$, $R^3$, $R^4$, $R^5$ and $R^6$ are preferably silyl groups substituted with one or more hydrocarbon groups. Here, examples of the hydrocarbon groups include alkyl groups having 1 to 10 carbon atoms such as a methyl group, an ethyl group, a n-propyl group, an isopropyl group, a n-butyl group, a sec.-butyl group, a tert.-butyl group, an isobutyl group, a n-pentyl group, a n-hexyl group, a cyclohexyl group, etc.; and aryl groups such as a phenyl group, etc. Specific examples of the silyl groups substituted with the hydrocarbon groups having 1 to 20 carbon atoms include mono-substituted silyl groups having 1 to 20 carbon atoms (e.g. a metylsilyl group, an ethylsilyl group, a phenylsilyl group, etc.), di-substituted silyl groups having 2 to 20 carbon atoms (e.g. a dimethylsilyl group, a diethylsilyl group, a diphenylsilyl group, etc.), and tri-substituted silyl groups having 3 to 20 carbon atoms (e.g. a trimethylsilyl group, a triethylsilyl group, a tri-n-propylsilyl group, a triisoproylsilyl group, a tri-n-butylsilyl group, a tri-sec.-butylsilyl group, a tri-tert.-butylsilyl group, a triisobutylsilyl group, a tert.-butyldimethylsilyl group, a tri-n-pentylsilyl group, a tri-n-hexylsilyl group, a tricyclohexylsilyl group, a triphenylsilyl group, etc.). Among them, a trimethylsilyl group, a tert.-butylsilyl group and a triphenylsilyl group are preferable.

The hydrocarbon groups of these substituted silyl groups may be substituted with one or more halogen atoms such as fluorine atoms, chlorine atoms, bromine atoms or iodine atoms; one or more alkoxy groups such as methoxy groups, ethoxy groups, etc.; one or more aryloxy groups such as phenoxy groups; or one or more aralkyloxy groups such as benzyloxy groups.

Examples of the alkoxy group for $X^1$, $X^2$, $R^1$, $R^2$, $R^3$, $R^4$, $R^5$ and $R^6$ are preferably alkoxy groups having 1 to 20 carbon atoms. Examples of such alkoxy groups include a methoxy group, an ethoxyl group, a n-propoxy group, a isopropoxy group, a n-butoxy group, a sec.-butoxy group, a tert.-butoxy group, a n-pentoxy group, a neopentoxy group, a n-hexoxy group, a n-octoxy group, a n-dodecoxy group, a n-pentadecoxy group, a n-eicosoxy group, etc. Among them, a methoxy group, an ethoxy group and a tert.-butoxy group are preferable.

Those alkoxy groups may be substituted with one or more halogen atoms such as fluorine atoms, chlorine atoms, bromine atoms or iodine atoms; one or more alkoxy groups such as methoxy groups, ethoxy groups, etc.; one or more aryloxy groups such as phenoxy groups; or one or more aralkyloxy groups such as benzyloxy groups.

Examples of the aralkyloxy group for $X^1$, $X^2$, $R^1$, $R^2$, $R^3$, $R^4$, $R^5$ and $R^6$ are preferably aralkyloxy groups having 7 to 20 carbon atoms. Specific examples of such aralkyloxy groups include a benzyloxy group, a (2-methylphenyl) methoxy group, a (3-methylphenyl)methoxy group, a (4-methylphenyl)methoxy group, a (2,3-dimethylphenyl) methoxy group, a (2,4-dimethylphenyl)methoxy group, a (2,5-dimethylphenyl)methoxy group, a (2,6-dimethylphenyl)methoxy group, a (3,4-dimethylphenyl) methoxy group, a (3,5-dimethylphenyl)methoxy group, a (2,3,4-trimethylphenyl)methoxy group, a (2,3,5-trimethylphenyl) methoxy group, a (2, 3, 6-trimethylphenyl) methoxy group, a (2,4,5-trimethylphenyl)methoxy group, a (2,4,6-trimethylphenyl) methoxy group, a (3,4,5-trimethylphenyl) methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl) methoxy group, an (ethylphenyl)methoxy group, a (n-propylphenyl)methoxy group, an (isopropylphenyl) methoxy group, a (n-butylphenyl)methoxy group, a (sec.-butylphenyl)methoxy group, a (tert.-butylphenyl)methoxy group, a (n-hexylphenyl)methoxy group, a (n-octylphenyl) methoxy group, a (n-decylphenyl)methoxy group, a (n-tetradecylphenyl)methoxy group, a naphthylmethoxy group, an anthracenylmethoxy group, etc. Among them, a benzyloxy group is preferable.

Those aralkyloxy groups may be substituted with one or more halogen atoms such as fluorine atoms, chlorine atoms, bromine atoms or iodine atoms; one or more alkoxy groups such as methoxy groups, ethoxy groups, etc.; one or more aryloxy groups such as phenoxy groups; or one or more aralkyloxy groups such as benzyloxy groups.

Examples of the aryloxy group for $X^1$, $X^2$, $R^1$, $R^2$, $R^3$, $R^4$, $R^5$ and $R^6$ are preferably aryloxy groups having 6 to 20 carbon atoms. Specific examples of such aryloxy groups include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec.-butylphenoxy group, a tert.-butylphenoxy group, a n-hexylphenoxy group, a n-octylphenoxy group, a n-decylphenoxy group, a n-tetradecylphenoxy group, a naphthoxy group, an anthracenoxy group, etc.

Those aryloxy groups may be substituted with one or more halogen atoms such as fluorine atoms, chlorine atoms, bromine atoms or iodine atoms; one or more alkoxy groups such as methoxy groups, ethoxy groups, etc.; one or more aryloxy groups such as phenoxy groups; or one or more aralkyloxy groups such as benzyloxy groups.

Examples of the di-substituted amino group for $X^1$, $X^2$, $R^1$, $R^2$, $R^3$, $R^4$, $R^5$ and $R^6$ are amino groups which are substituted with two hydrocarbon groups. Here, examples of the hydrocarbon groups include alkyl groups having 1 to 10 carbon atoms such as a methyl group, an ethyl group, a n-propyl group, an isopropyl group, a a n-butyl group, a sec.-butyl group, a tert.-butyl group, an isobutyl group, a n-pentyl group, a n-hexyl group, a cyclohexyl group, etc.; aryl groups having 6 to 10 carbon atoms such as a phenyl group; aralkyl groups having 7 to 10 carbon atoms, etc. Specific examples of such amino groups substituted with two hydrocarbon groups include a dimethylamino group, a diethylamino group, a di-n-propylamino group, a diisopropylamino group, a di-n-butylamino group, a di-sec.-butylamino group, a di-tert.-butylamino group, a diisobutylamino group, a tert.-butylisopropylamino group, a di-n-hexylamino group, a di-n-octylamino group, a di-n-decylamino group, a diphenylamino group, a bis-trimethylsilylamino group, a bis-tert.-butyldimethylsilylamino group, etc. Among them, a dimethylamino group and a diethylamino group are preferable.

Those di-substituted amino groups may be substituted with one or more halogen atoms such as fluorine atoms, chlorine atoms, bromine atoms or iodine atoms; one or more alkoxy groups such as methoxy groups, ethoxy groups, etc.; one or more aryloxy groups such as phenoxy groups; or one or more aralkyloxy groups such as benzyloxy groups.

The substituents $R^1$, $R^2$, $R^3$, $R^4$, $R^5$ and $R^6$ may optionally be bonded to form a ring.

Preferable groups for $R^1$ include alkyl groups, aralkyl groups, aryl groups and substituted silyl groups.

Preferable groups for $X^1$ and $X^2$ include independently each other halogen atoms, alkyl group, aralkyl group, alkoxy groups aryloxy groups and di-substituted amino groups, and halogen atoms and alkoxy groups are more preferable.

Examples of the elements of the 16 groups of the Periodic Table represented by $X^3$ in the formula [II] or [III] include an oxygen atom, a sulfur atom, a selenium atom, etc. Among them, an oxygen atom is preferable.

Preferable examples of the transition metal complex of the formula [I] are as follows:

Transition metal complex of the formula [I] in which J is a carbon atom:

methylene (cyclopentadienyl) (3,5-dimethyl-2-phenoxy) titanium dichloride, methylene(cyclopentadienyl)(3-tert.-butyl-2-phenoxy)titanium dichloride, methylene (cyclopentadienyl)(3-tert.-butyl-5-methyl-2-phenoxy) titanium dichloride, methylene(cyclopentadienyl)(3-pheyl-2-phenoxy)titanium dichloride, methylene (cyclopentadienyl)(3-tert.-butyldimethylsilyl-5-methyl-2-phenoxy)titanium dichloride, methylene (cyclopentadienyl)(3-trimethylsilyl-5-methyl-2-phenoxy)titanium dichloride, methylene (cyclopentadienyl)(3-tert.-butyl-5-methoxy-2-phenoxy)titanium dichloride, methylene (cyclopentadienyl)(3-tert.-butyl-5-chloro-2-phenoxy) titanium dichloride, methylene (methylcyclopentadienyl)(3,5-dimethyl-2-phenoxy) titanium dichloride, methylene (methylcyclopentadienyl)(3-tert.-butyl-2-phenoxy) titanium dichloride, methylene (methylcyclopentadienyl)(3-tert.-butyl-5-methyl-2-phenoxy)titanium dichloride, methylene (methylcyclopentadienyl)(3-phenyl-2-phenoxy) titanium dichloride, methylene (methylcyclopentadienyl)(3-tert.-butyldimethylsilyl-5-methyl-2-phenoxy)titanium dichloride, methylene (methylcyclopentadienyl)(3-trimethylsilyl-5-methyl-2-phenoxy)titanium dichloride, methylene (methylcyclopentadienyl)(3-tert.-butyl-5-methoxy-2-phenoxy)titanium dichloride, methylene (methylcyclopentadienyl)(3-tert.-butyl-5-chloro-2-phenoxy)titanium dichloride, methylene(tert.-butylcyclopentadienyl)(3,5-dimethyl-2-phenoxy) titanium dichloride, methylene(tert.-butylcyclopentadienyl)(3-tert.-butyl-2-phenoxy) titanium dichloride, methylene(tert.-butylcyclopentadienyl)(3-tert.-butyl-5-methyl-2-phenoxy)titanium dichloride, methylene(tert.-butylcyclopentadienyl) (3-phenyl-2-phenoxy) titanium dichloride, methylene(tert.-butylcyclopentadienyl)(3-tert.-butyldimethylsilyl-5-methyl-2-phenoxy)titanium dichloride, methylene(tert.-butylcyclopentadienyl)(3-trimethylsilyl-5-methyl-2-phenoxy)titanium dichloride, methylene(tert.-butylcyclopentadienyl)(3-tert.-butyl-5-methoxy-2-phenoxy)titanium dichloride, methylene(tert.-butylcyclopentadienyl)(3-tert.-butyl-5-chloro-2-phenoxy)titanium dichloride, methylene (tetramethylcyclopentadienyl)(3,5-dimethyl-2-phenoxy)titanium dichloride, methylene (tetramethylcyclopentadienyl)(3-tert.-butyl-2-phenoxy)titanium dichloride, methylene (tetramethylcyclopentadienyl)(3-tert.-butyl-5-methyl-2-phenoxy)titanium dichloride, methylene (tetramethylcyclopentadienyl)(3-phenyl-2-phenoxy) titanium dichloride, methylene (tetramethylcyclopentadienyl)(3-tert.-butyldimethylsilyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert.-butyl-5-methoxy-2-phenoxy)titanium dichloride, methylene(tetramethylcyclopentadienyl)(3-tert.-butyl-5-chloro-2-phenoxy)titanium dichloride, methylene(trimethylsilylcyclopentadienyl)(3,5-dimethyl-2-phenoxy)titanium dichloride, methylene(trimethylsilylcyclopentadienyl)(3-tert.-butyl-2-phenoxy)titanium dichloride, methylene(trimethylsilylcyclopentadienyl)(3-tert.-butyl-5-methyl-2-phenoxy)titanium dichloride, methylene(trimethylsilylcyclopentadienyl)(3-phenyl-2-phenoxy)titanium dichloride, methylene(trimethylsilylcyclopentadienyl)(3-tert.-butyldimethylsilyl-5-methyl-2-phenoxy)titanium dichloride, methylene(trimethylsilylcyclopentadienyl)(3-trimethylsilyl-5-methyl-2-phenoxy)titanium dichloride, methylene(trimethylsilylcyclopentadienyl)(3-tert.-butyl-5-methyxy-2-phenoxy)titanium dichloride, methylene(trimethylsilylcyclopentadienyl)(3-tert.-butyl-5-chloro-2-phenoxy)titanium dichloride, methylene(fluorenyl)(3,5-dimethyl-2-phenoxy)titanium dichloride, methylene(fluorenyl)(3-tert.-butyl-2-phenoxy)titanium dichloride, methylene(fluorenyl)(3-tert.-butyl-5-methyl-2-phenoxy)titanium dichloride, methylene(fluorenyl)(3-phenyl-2-phenoxy)titanium dichloride, methylene(fluorenyl)(3-tert.-butyldimethylsilyl-5-methyl-2-phenoxy)titanium dichloride, methylene(fluorenyl)(3-trimethylsilyl-5-methyl-2-phenoxy)titanium dichloride, methylene(fluorenyl)(3-tert.-butyl-5-methoxy-2-phenoxy)titanium dichloride, methylene(fluorenyl)(3-tert.-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert.-butyl-2-phenoxy)titanium dichloride, isopropylidene(cyclopentadienyl)(³-tert.-butyl-5-methyl-2-phenoxy)titanium dichloride, isopropylidene(cyclopentadienyl)(³-phenyl-2-phenoxy)titanium dichloride, isopropylidene(cyclopentadienyl)(3-tert.-butyldimethylsilyl-5-methyl-2-phenoxy)titanium dichloride, isopropylidene(cyclopentadienyl)(3-trimethylsilyl-5-methyl-2-phenoxy)titanium dichloride, isopropylidene(cyclopentadienyl)(³-tert.-butyl-5-methoxy-2-phenoxy)titanium dichloride, isopropylidene(cyclopentadienyl)(3-tert.-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert.-butyl-2-phenoxy)titanium dichloride, isopropylidene(methylcyclopentadienyl)(3-tert.-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert.-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert.-butyl-5-methoxy-2-phenoxy)titanium dichloride, isopropylidene(methylcyclopentadienyl)(3-tert.-butyl-5-chloro-2-phenoxy)titanium dichloride, isopropylidene(tert.-butylcyclopentadienyl)(3,5-dimethyl-2-phenoxy)titanium dichloride, isopropylidene(tert.-butylcyclopentadienyl)(3-tert.-butyl-2-phenoxy)titanium dichloride, isopropylidene(tert.-butylcyclopentadienyl)(3-tert.-butyl-5-methyl-2-phenoxy)titanium dichloride, isopropylidene(tert.-butylcyclopentadienyl) (3-phenyl-2-phenoxy) titanium dichloride, isopropylidene(tert.-butylcyclopentadienyl)(3-tert.-butyldimethylsilyl-5-methyl-2-phenoxy)titanium dichloride, isopropylidene(tert.-butylcyclopentadienyl)(3-trimethylsilyl-5-methyl-2-phenoxy)titanium dichloride, isopropylidene(tert.-butylcyclopentadienyl)(3-tert.-butyl-5-methoxy-2-phenoxy)titanium dichloride, isopropylidene(tert.-butylcyclopentadienyl)(3-tert.-butyl-5-chloro-2-phenoxy)titanium dichloride, isopropylidene(tetramethylcyclopentadienyl)(3,5-dimethyl-2-phenoxy)titanium dichloride, isopropylidene(tetramethylcyclopentadienyl)(3-tert.-butyl-2-phenoxy)titanium dichloride, isopropylidene(tetramethylcyclopentadienyl)(3-tert.-butyl-5-methyl-2-phenoxy)titanium dichloride, isopropylidene(tetramethylcyclopentadienyl)(3-phenyl-2-phenoxy)titanium dichloride, isopropylidene(tetramethylcyclopentadienyl)(3-tert.-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert.-butyl-5-methoxy-2-phenoxy)titanium dichloride, isopropylidene(tetramethylcyclopentadienyl)(3-tert.-butyl-5-chloro-2-phenoxy)titanium dichloride, isopropylidene(trimethylsilylcyclopentadienyl)(3,5-dimethyl-2-phenoxy)titanium dichloride, isopropylidene(trimethylsilylcyclopentadienyl)(3-tert.-butyl-2-phenoxy)titanium dichloride, isopropylidene(trimethylsilylcyclopentadienyl)(3-tert.-butyl-5-methyl-2-phenoxy)titanium dichloride, isopropylidene(trimethylsilylcyclopentadienyl)(3-phenyl-2-phenoxy) titanium dichloride, isopropylidene(trimethylsilylcyclopentadienyl)(3-tert.-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert.-butyl-5-methoxy-2-phenoxy)titanium dichloride, isopropylidene(trimethylsilylcyclopentadienyl)(3-tert.-butyl-5-chloro-2-phenoxy)titanium dichloride, isopropylidene(fluorenyl)(3,5-dimethyl-2-phenoxy)titanium dichloride, isopropylidene(fluorenyl)(3-tert.-butyl-2-phenoxy)titanium dichloride, isopropylidene(fluorenyl)(3-tert.-butyl-5-methyl-2-phenoxy)titanium dichloride, isopropylidene(fluorenyl)(3-phenyl-2-phenoxy)titanium dichloride, isopropylidene(fluorenyl)(3-tert.-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert.-butyl-5-methoxy-2-phenoxy)titanium dichloride, isopropylidene(fluorenyl)(3-tert.-butyl-5-chloro-2-phenoxy)titanium dichloride, diphenylmethylene(cyclopentadienyl)(3,5-dimethyl-2-phenoxy)titanium dichloride, diphenylmethylene(cyclopentadienyl)(3-tert.-butyl-2-phenoxy)titanium dichloride, diphenylmethylene(cyclopentadienyl)(3-tert.-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert.-butyldimethylsilyl-5- methyl-2-phenoxy)titanium dichloride, diphenylmethylene(cyclopentadienyl)(3-trimethylsilyl-5-methyl-2-phenoxy)titanium dichloride, diphenylmethylene(cyclopentadienyl)(3-tert.-butyl-5-methoxy-2-phenoxy)titanium dichloride, diphenylmethylene(cyclopentadienyl)(3-tert.-butyl-5-chloro-2-phenoxy)titanium dichloride, diphenylmethylene(methylcyclopentadienyl)(3,5-dimethyl-2-phenoxy)titanium dichloride, diphenylmethylene(methylcyclopentadienyl)(3-tert.-butyl-2-phenoxy)titanium dichloride, diphenylmethylene(methylcyclopentadienyl)(3-tert.-butyl-5-methyl-2-phenoxy)titanium dichloride, diphenylmethylene(methylcyclopentadienyl)(3-phenyl-2-phenoxy)titanium dichloride, diphenylmethylene(methylcyclopentadienyl)(3-tert.-butyldimethylsilyl-5-methyl-2-phenoxy)titanium dichloride, diphenylmethylene(methylcyclopentadienyl)(3-trimethylsilyl-5-methyl-2-phenoxy)titanium dichloride, diphenylmethylene(methylcyclopentadienyl)(3-tert.-butyl-5-methoxy-2-phenoxy)titanium dichloride, diphenylmethylene(methylcyclopentadienyl)(3-tert.-butyl-5-chloro-2-phenoxy)titanium dichloride, diphenylmethylene(tert.-butylcyclopentadienyl)(3,5-dimethyl-2-phenoxy)titanium dichloride, diphenylmethylene(tert.-butylcyclopentadienyl)(3-tert.-butyl-2-phenoxy)titanium dichloride, diphenylmethylene(tert.-butylcyclopentadienyl)(3-tert.-butyl-5-methyl-2-phenoxy)titanium dichloride, diphenylmethylene(tert.-butylcyclopentadienyl)(3-phenyl-2-phenoxy)titanium dichloride, diphenylmethylene(tert.-butylcyclopentadienyl)(3-tert.-butyldimethylsilyl-5-methyl-2-phenoxy)titanium dichloride, diphenylmethylene(tert.-butylcyclopentadienyl)(3-trimethylsilyl-5-methyl-2-phenoxy)titanium dichloride, diphenylmethylene(tert.-butylcyclopentadienyl)(3-tert.-butyl-5-methoxy-2-phenoxy)titanium dichloride, diphenylmethylene(tert.-butylcyclopentadienyl)(3-tert.-butyl-5-chloro-2-phenoxy)titanium dichloride, diphenylmethylene(tetramethylcyclopentadienyl)(3,5-dimethyl-2-phenoxy)titanium dichloride, diphenylmethylene(tetramethylcyclopentadienyl)(3-tert.-butyl-2-phenoxy)titanium dichloride, diphenylmethylene(tetramethylcyclopentadienyl)(3-tert.-butyl-5-methyl-2-phenoxy)titanium dichloride, diphenylmethylene(tetramethylcyclopentadienyl)(3-phenyl-2-phenoxy)titanium dichloride, diphenylmethylene(tetramethylcyclopentadienyl)(3-tert.-butyldimethylsilyl-5-methyl-2-phenoxy)titanium dichloride, diphenylmethylene(tetramethylcyclopentadienyl)(3-trimethylsilyl-5-methyl-2-phenoxy)titanium dichloride, diphenylmethylene(tetramethylcyclopentadienyl)(3-tert.-butyl-5-methoxy-2-phenoxy)titanium dichloride, diphenylmethylene(tetramethylcyclopentadienyl)(3-tert.-butyl-5-chloro-2-phenoxy)titanium dichloride, diphenylmethylene(trimethylsilylcyclopentadienyl)(3,5-dimethyl-2-phenoxy)titanium dichloride, diphenylmethylene(trimethylsilylcyclopentadienyl)(3-tert.-butyl-2-phenoxy)titanium dichloride, diphenylmethylene(trimethylsilylcyclopentadienyl)(3-tert.-butyl-5-methyl-2-phenoxy)titanium dichloride, diphenylmethylene(trimethylsilylcyclopentadienyl)(3-phenyl-2-phenoxy)titanium dichloride, diphenylmethylene(trimethylsilylcyclopentadienyl)(3-tert.-butyldimethylsilyl-5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert.-butyl-5-methoxy-2-phenoxy)titanium dichloride, diphenylmethylene(trimethylsilylcyclopentadienyl)(3-tert.-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert.-butyl-2-phenoxy)titanium dichloride, diphenylmethylene(fluorenyl)(3-tert.-butyl-5-methyl-2-phenoxy)titanium dichloride, diphenylmethylene(fluorenyl)(3-phenyl-2-phenoxy)titanium dichloride, diphenylmethylene(fluorenyl)(3-tert.-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert.-butyl-5-methoxy-2-phenoxy)titanium dichloride, diphenylmethylene(fluorenyl)(3-tert.-butyl-5-chloro-2-phenoxy)titanium dichloride, etc.;

the above compounds in which titanium is replaced with zirconium or hafnium;

the above compounds in which dichloride is replaced with dibromide, diiodide, bis(dimethylamide), bis(diethylamide), di-n-butoxide or diisopropoxide;

the above compounds in which (cyclopentadienyl) is replaced with (dimethylcyclopentadienyl), (trimethylcyclopentadienyl), (n-butylcyclopentadienyl), (tert.-butyldimethylsilylcyclopentadienyl) or (indenyl); the above compounds in which (3,5-dimethyl-2-phenoxy) is replaced with (2-phenoxy), (3-methyl-2-phenoxy), (3,5-di-tert.-butyl-2-phenoxy), (3-phenyl-5-methyl-2-phenoxy), (3-tert.-butyldimethylsilyl-2-phenoxy) or (3-trimethylsilyl-2-phenoxy);

Transition metal complex of the formula [I] in which J is an element of the 14 group of the Periodic Table other than a carbon atom: dimethylsilyl(cyclopentadienyl)(2-phenoxy)titanium dichloride, dimethylsilyl(cyclopentadienyl)(3-methyl-2-phenoxy)titanium dichloride, dimethylsilyl(cyclopentadienyl)(3,5-dimethyl-2-phenoxy)titanium dichloride, dimethylsilyl(cyclopentadienyl)(3-tert.-butyl-2-phenoxy)titanium dichloride, dimethylsilyl(cyclopentadienyl)(3-tert.-butyl-5-methyl-2-phenoxy)titanium dichloride, dimethylsilyl(cyclopentadienyl)(3,5-di-tert.-butyl-2-phenoxy)titanium dichloride, dimethylsilyl(cyclopentadienyl)(5-methyl-3-phenyl-2-phenoxy)titanium dichloride, dimethylsilyl(cyclopentadienyl)(3-tert.-butyldimethylsilyl-5-methyl-2-phenoxy)titanium dichloride, dimethylsilyl(cyclopentadienyl)(5-methyl-3-trimethylsilyl-2-phenoxy)titanium dichloride, dimethylsilyl(cyclopentadienyl)(3-tert.-butyl-5-methoxy-2-phenoxy)titanium dichloride, dimethylsilyl(cyclopentadienyl)(3-tert.-butyl-5-chloro-2-phenoxy)titanium dichloride, dimethylsilyl(cyclopentadienyl)(3,5-diamyl-2-phenoxy)titanium dichloride, dimethylsilyl(methylcyclopentadienyl)(2-phenoxy)titanium dichloride, dimethylsilyl(methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl(methylcyclopentadienyl)(3-tert.-butyl-2-phenoxy)titanium dichloride, dimethylsilyl(methylcyclopentadienyl)(3-tert.-butyl-5-methyl-2-phenoxy)titanium dichloride, dimethylsilyl (methylcyclopentadienyl)(3,5-di-tert.-butyl-2-phenoxy) titanium dichloride, dimethylsilyl (methylcyclopentadienyl)(5-methyl-3-phenyl-2-phenoxy)titanium dichloride, dimethylsilyl (methylcyclopentadienyl)(3-tert.-butyldimethylsilyl-5-methyl-2-phenoxy)titanium dichloride, dimethylsilyl (methylcyclopentadienyl)(5-methyl-3-trimethylsilyl-2-phenoxy)titanium dichloride, dimethylsilyl (methylcyclopentadienyl)(3-tert.-butyl-5-methoxy-2-phenoxy)titanium dichloride, dimethylsilyl (methylcyclopentadienyl)(3-tert.-butyl-5-chloro-2-phenoxy)titanium dichloride, dimethylsilyl (methylcyclopentadienyl)(3,5-diamyl-2-phenoxy) titanium dichloride, dimethylsilyl(n-butylcyclopentadienyl)(2-phenoxy)titanium dichloride, dimethylsilyl(n-butylcyclopentadienyl)(3-methyl-2-phenoxy)titanium dichloride, dimethylsilyl(n-butylcyclopentadienyl)(3,5-dimethyl-2-phenoxy)titanium dichloride, dimethylsilyl(n-butylcyclopentadienyl)(3-tert.-butyl-2-phenoxy)titanium dichloride, dimethylsilyl (n-butylcyclopentadienyl)(3-tert.-butyl-5-methyl-2-phenoxy)titanium dichloride, dimethylsilyl(n-butylcyclopentadienyl)(3,5-di-tert.-butyl-2-phenoxy) titanium dichloride, dimethylsilyl(n-butylcyclopentadienyl)(5-methyl-3-phenyl-2-phenoxy) titanium dichloride, dimethylsilyl(n-butylcyclopentadienyl)(3-tert.-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert. -butyl-5-methoxy-2-phenoxy)titanium dichloride, dimethylsilyl(n-butylcyclopentadienyl)(3-tert.-butyl-5-chloro-2-phenoxy)titanium dichloride, dimethylsilyl(n-butylcyclopentadienyl)(3,5-diamyl-2-phenoxy)titanium dichloride, dimethylsilyl(tert.-butylcyclopentadienyl)(2-phenoxy)titanium dichloride, dimethylsilyl(tert.-butylcyclopentadienyl)(3-methyl-2-phenoxy) titanium dichloride, dimethylsilyl(tert.-butylcyclopentadienyl)(3, 5-dimethyl-2-phenoxy)titanium dichloride, dimethylsilyl (tert.-butylcyclopentadienyl)(3-tert.-butyl-2-phenoxy) titanium dichloride, dimethylsilyl(tert.-butylcyclopentadienyl)(3-tert.-butyl-5-methyl-2-phenoxy)titanium dichloride, dimethylsilyl(tert.-butylcyclopentadienyl)(3,5-di-tert.-butyl-2-phenoxy) titanium dichloride, dimethylsilyl(tert.-butylcyclopentadienyl)(5-methyl-3-phenyl-2-phenoxy) titanium dichloride, dimethylsilyl(tert.-butylcyclopentadienyl)(3-tert.-butyldimethylsilyl-5-methyl-2-phenoxy)titanium dichloride, dimethylsilyl (tert.-butylcyclopentadienyl)(5-methyl-3-trimethylsilyl-2-phenoxy)titanium dichloride, dimethylsilyl(tert.-butylcyclopentadienyl)(3-tert.-butyl-5-methoxy-2-phenoxy)titanium dichloride, dimethylsilyl(tert.-butylcyclopentadienyl)(3-tert.-butyl-5-chloro-2-phenoxy)titanium dichloride, dimethylsilyl(tert.-butylcyclopentadienyl)(3,5-diamyl-2-phenoxy)titanium dichloride, dimethylsilyl(tetramethylcyclopentadienyl)(2-phenoxy)titanium dichloride, dimethylsilyl (tetramethylcyclopentadienyl)(3-methyl-2-phenoxy) titanium dichloride, dimethylsilyl (tetramethylcyclopentadienyl)(3,5-dimethyl-2-phenoxy) titanium dichloride, dimethylsilyl (tetramethylcyclopentadienyl)(3-tert.-butyl-2-phenoxy) titanium dichloride, dimethylsilyl (tetramethylcyclopentadienyl)(3-tert.-butyl-5-methyl-2-phenoxy)titanium dichloride, dimethylsilyl (tetramethylcyclopentadienyl)(3,5-di-tert.-butyl-2-phenoxy)titanium dichloride, dimethylsilyl (tetramethylcyclopentadienyl)(5-methyl-3-phenyl-2-phenoxy)titanium dichloride, dimethylsilyl (tetramethylcyclopentadienyl)(3-tert.-butyldimethylsilyl-5-methyl-2-phenoxy)titanium dichloride, dimethylsilyl (tetramethylcyclopentadienyl)(5-methyl-3-trimethylsilyl-2-phenoxy)titanium dichloride, dimethylsilyl (tetramethylcyclopentadienyl)(3-tert.-butyl-5-methoxy-2-phenoxy)titanium dichloride, dimethylsilyl (tetramethylcyclopentadienyl)(3-tert.-butyl-5-chloro-2-phenoxy)titanium dichloride, dimethylsilyl (tetramethylcyclopentadienyl)(3,5-diamyl-2-phenoxy) titanium dichloride, dimethylsilyl (trimethylsilylcyclopentadienyl)(2-phenoxy)titanium dichloride, dimethylsilyl(trimethylsilylcyclopentadienyl) (3-methyl-2-phenoxy)titanium dichloride, dimethylsilyl (trimethylsilylcyclopentadienyl)(3,5-dimethyl-2-phenoxy)titanium dichloride, dimethylsilyl (trimethylsilylcyclopentadienyl)(3-tert.-butyl-2-phenoxy) titanium dichloride, dimethylsilyl (trimethylsilylcyclopentadienyl)(3-tert.-butyl-5-methyl-2-phenoxy)titanium dichloride, dimethylsilyl (trimethylsilylcyclopentadienyl)(3,5-di-tert.-butyl-2-phenoxy)titanium dichloride, dimethylsilyl (trimethylsilylcyclopentadienyl)(5-methyl-3-phenyl-2-phenoxy)titanium dichloride, dimethylsilyl (trimethylsilylcyclopentadienyl)(3-tert.-butyldimethylsilyl-5-methyl-2-phenoxy)titanium dichloride, dimethylsilyl(trimethylsilylcyclopentadienyl) (5-methyl-3-trimethylsilyl-2-phenoxy)titanium dichloride, dimethylsilyl(trimethylsilylcyclopentadienyl) (3-tert.-butyl-5-methoxy-2-phenoxy)titanium dichloride, dimethylsilyl(trimethylsilylcyclopentadienyl)(3-tert.-butyl-5-chloro-2-phenoxy)titanium dichloride, dimethylsilyl(trimethylsilylcyclopentadienyl)(3,5-diamyl-2-phenoxy)titanium dichloride, dimethylsilyl (indenyl)(2-phenoxy)titanium dichloride, dimethylsilyl (indenyl)(3-methyl-2-phenoxy)titanium dichloride, dimethylsilyl(indenyl)(3-tert.-butyl-2-phenoxy)titanium dichloride, dimethylsilyl(indenyl)(3-tert.-butyl-5-methyl-2-phenoxy)titanium dichloride, dimethylsilyl(indenyl)(3, 5-di-tert.-butyl-2-phenoxy)titanium dichloride, dimethylsilyl(indenyl)(5-methyl-3-phenyl-2-phenoxy) titanium dichloride, dimethylsilyl(indenyl)(3-tert.-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert.-butyl-5-methoxy-2-phenoxy)titanium dichloride, dimethylsilyl(indenyl)(3-tert.-butyl-5-chloro-2-phenoxy)titanium dichloride, dimethylsilyl(indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy) titanium dichloride, dimethylsilyl(fluorenyl)(3,5-dimethyl-2-phenoxy)titanium dichloride, dimethylsilyl (fluorenyl)(3-tert.-butyl-2-phenoxy)titanium dichloride, dimethylsilyl(fluorenyl)(3-tert.-butyl-5-methyl-2-phenoxy)titanium dichloride, dimethylsilyl(fluorenyl)(3, 5-di-tert.-butyl-2-phenoxy)titanium dichloride, dimethylsilyl(fluorenyl)(5-methyl-3-phenyl-2-phenoxy) titanium dichloride, dimethylsilyl(fluorenyl)(3-tert.-butydimethylsilyl-5-methyl-2-phenoxy)titanium dichloride, dimethylsilyl(fluorenyl)(5-methyl-3-trimethylsilyl-2-phenoxy)titanium dichloride, dimethylsilyl(fluorenyl)(3-tert.-butyl-5-methoxy-2-phenoxy)titanium dichloride, dimethylsilyl(fluorenyl)(3- tert.-butyl-5-chloro-2-phenoxy)titanium dichloride, dimethylsilyl(fluorenyl)(3,5-diamyl-2-phenoxy)titanium dichloride, dimethylsilyl(tetramethylcyclopentadienyl)(1-naphthoxy-2-yl)titanium dichloride, etc.;

the above compounds in which (cyclopentadienyl) is replaced with (dimethylcyclopentadienyl), (trimethylcyclopentadienyl), (ethylcyclopentadienyl), (n-propylcyclopentadienyl), (isopropylcyclopentadienyl), (sec.-butylcyclopentadienyl), (isobutylcyclopentadienyl), (tert.-butylcyclopentadienyl), (phenylcyclopentadienyl), (methylindenyl) or (phenylindenyl); the above compounds in which (2-phenoxy) is replaced with (3-phenyl-2-phenoxy), (3-trimethylsilyl-2-phenoxy) or (3-tert.-butyldimethylsilyl-2-phenoxy);

the above compounds in which dimethylsilyl is replaced with diethylsilyl, diphenylsilyl or dimethoxysilyl;

the above compounds in which titanium is replaced with zirconium or hafnium; and the above compounds in which dichloride is replaced with dibromide, diiodide, bis(dimethylamide), bis(diethylamide), di-n-butoxide or diisopropoxide.

Preferable examples of the transition metal complex of the formula [II] are as follows:

$\mu$-oxobis[isopropylidene(cyclopentadienyl)(2-phenoxy)titanium chloride], $\mu$-oxobis[isopropylidene(cyclopentadienyl)(2-phenoxy)titanium methoxide], $\mu$-oxobis[isopropylidene(cyclopentadienyl)(3-tert.-butyl-5-methyl-2-phenoxy)titanium chloride], $\mu$-oxobis[isopropylidene(cyclopentadienyl)(3-tert.-butyl-5-methyl-2-phenoxy)titanium methoxide], $\mu$-oxobis[isopropylidene(methylcyclopentadienyl)(2-phenoxy)titanium chloride], $\mu$-oxobis[isopropylidene(methylcyclopentadienyl)(2-phenoxy)titanium methoxide], $\mu$-oxobis[isopropylidene(methylcyclopentadienyl)(3-tert.-butyl-5-methyl-2-phenoxy)titanium chloride], $\mu$-oxobis[isopropylidene(methylcyclopentadienyl)(3-tert.-butyl-5-methyl-2-phenoxy)titanium methoxide], $\mu$-oxobis[isopropylidene(tetramethylcyclopentadienyl)(2-phenoxy)titanium chloride], $\mu$-oxobis[isopropylidene(tetramethylcyclopentadienyl)(2-phenoxy)titanium methoxide], $\mu$-oxobis[isopropylidene(tetramethylcyclopentadienyl)(3-tert.-butyl-5-methyl-2-phenoxy)titanium chloride], $\mu$-oxobis[isopropylidene(tetramethylcyclopentadienyl)(3-tert.-butyl-5-methyl-2-phenoxy)titanium methoxide], $\mu$-oxobis[dimethylsilylene(cyclopentadienyl)(2-phenoxy)titanium chloride], $\mu$-oxobis[dimethylsilylene(cyclopentadienyl)(2-phenoxy)titanium methoxide], $\mu$-oxobis[dimethylsilylene(cyclopentadienyl)(3-tert.-butyl-5-methyl-2-phenoxy)titanium chloride], $\mu$-oxobis[dimethylsilylene(cyclopentadienyl)(3-tert.-butyl-5-methyl-2-phenoxy)titanium methoxide], $\mu$-oxobis[dimethylsilylene(methylcyclopentadienyl)(2-phenoxy)titanium chloride], $\mu$-oxobis[dimethylsilylene(methylcyclopentadienyl)(2-phenoxy)titanium methoxide], $\mu$-oxobis[dimethylsilylene(methylcyclopentadienyl)(3-tert.-butyl-5-methyl-2-phenoxy)titanium chloride], $\mu$-oxobis[dimethylsilylene(methylcyclopentadienyl)(3-tert.-butyl-5-methyl-2-phenoxy)titanium methoxide], $\mu$-oxobis[dimethylsilylene(tetramethylcyclopentadienyl)(2-phenoxy)titanium chloride], $\mu$-oxobis[dimethylsilylene(tetramethylcyclopentadienyl)(2-phenoxy)titanium methoxide], $\mu$-oxobis[dimethylsilylene(tetramethylcyclopentadienyl)(3-tert.-butyl-5-methyl-2-phenoxy)titanium chloride], $\mu$-oxobis[dimethylsilylene(tetramethylcyclopentadienyl)(3-tert.-butyl-5-methyl-2-phenoxy)titanium methoxide], etc.

Preferable examples of the transition metal complex of the formula [III] are as follows:

di-$\mu$-oxobis[isopropylidene(cyclopentadienyl)(2-phenoxy)titanium], di-$\mu$-oxobis[isopropylidene(cyclopentadienyl)(3-tert.-butyl-5-methyl-2-phenoxy)titanium], di-$\mu$-oxobis[isopropylidene(methylcyclopentadienyl)(2-phenoxy)titanium], di-$\mu$-oxobis[isopropylidene(methylcyclopentadienyl)(3-tert.-butyl-5-methyl-2-phenoxy)titanium], di-$\mu$-oxobis[isopropylidene(tetramethylcyclopentadienyl)(2-phenoxy)titanium], di-$\mu$-oxobis[isopropylidene(tetramethylcyclopentadienyl)(3-tert.-butyl-5-methyl-2-phenoxy)titanium], di-$\mu$-oxobis[dimethylsilylene(cyclopentadienyl)(2-phenoxy)titanium], di-$\mu$-oxobis[dimethylsilylene(cyclopentadienyl)(3-tert.-butyl-5-methyl-2-phenoxy)titanium], di-$\mu$-oxobis[dimethylsilylene(methylcyclopentadienyl)(2-phenoxy)titanium], di-$\mu$-oxobis[dimethylsilylene(methylcyclopentadienyl)(3-tert.-butyl-5-methyl-2-phenoxy)titanium], di-$\mu$-oxobis[dimethylsilylene(tetramethylcyclopentadienyl)(2-phenoxy)titanium], di-$\mu$-oxobis[dimethylsilylene(tetramethylcyclopentadienyl)(3-tert.-butyl-5-methyl-2-phenoxy)titanium], etc.

A transition metal complex of the formula [I] maybe prepared by the method disclosed in, for example, W097/03992. A transition metal complex of the formula [II] or [III] may be prepared by reacting a transition metal complex of the formula [I] with one or two equivalents of water.

(B) Aluminum Compounds

The aluminum compound (B) is at least one aluminum compound selected from the group consisting of the following compounds (B1), (B2) and (B3):

(B1) an organic aluminum compound of the formula:

$$E^1_a AlZ_{3-a},$$

(B2) a cyclic aluminoxane of the formula:

$$[-Al(E^2)-O-]_b,$$

and (B3) a linear aluminoxane of the formula:

$$E^3[-Al(E^3)-O-]_c AlE^3_2$$

wherein $E^1$, $E^2$ and $E^3$ represent independently each other a hydrocarbon group, provided that all $E^1$'s, all $E^2$'s and all $E^3$'s may be the same or different; Z is a hydrogen atom or a halogen atom, provided that all Z's may be the same or different; a is a number which satisfies the formula: $0<a\leq3$, b is an integer of 2 or more; and c is an integer of 1 or more.

A hydrocarbon group for $E^1$, $E^2$ or $E^3$ is preferably a hydrocarbon group having 1 to 8 carbon atoms, more preferably an alkyl group.

Specific examples of the organic aluminum compound (B1) of the formula: $E^1_a AlZ_{3-a}$ are as follows:

trialkylaluminums such as trimethylaluminum, triethylaluminum, tripropylaluminum, triisobutylaluminum, trihexylaluminum, etc.; dialkylaluminum chlorides such as dimethylaluminum chloride, diethylaluminum chloride, dipropylaluminum chloride, diisopropylaluminum chloride, dihexylaluminum chloride, etc., alkylaluminum dichlorides such as methylaluminum dichloride, ethylaluminum dichloride, propylaluminum dichloride, isobutylaluminum dichloride, hexylaluminum dichloride, etc.; and dialkylaluminum hydrides such as dimethylaluminum hydride, diethylaluminum hydride, dipropylaluminum hydride, diisobutylaluminum hydride, dihexylaluminum hydride, etc.

Among them, trialkylaluminums are preferable, and triethylaluminum and triisobutylaluminum are more preferable.

Examples of the substutuents $E^2$ and $E^3$ in the cyclic aluminoxane (B2) of the formula: $[-Al(E^2)-O-]_b$ and the linear aluminoxane of the formula: $E^3[-Al(E^3)-O-]_cAlE^3_2$ are alkyl groups such as a methyl group, an ethyl group, a n-propyl group, an isopropyl group, a n-butyl group, an isobutyl group, a n-pentyl group, a neopentyl group, etc.

"b" is an integer of 2 or more, and "c" is an integer of 1 or more.

Preferably, $E^2$ and $E^3$ are both methyl or isobutyl groups, "b" is an integer of 2 to 40, and "c" is an integer of 1 to 40.

The above aluminoxanes may be prepared by various methods, which are not particularly limited, and can be prepared according to conventional methods. For example, an alumioxane may be prepared by allowing a solution of a trialkylaluminum (e.g. trimethylaluminum etc.) in an organic solvent (e.g. benzene, aliphatic hydrocarbons, etc.) in contact with water. Alternatively, an aluminoxane may be prepared by allowing a trialkylaluminum (e.g. trimethylaluminum, etc.) with a metal salt containing water of crystallization (e.g. copper sulfatehydrate, etc.).

(C) Boron Compounds

A boron compound (C) is any one of (C1) a boron compound of the formula: $BQ^1Q^2Q^3$, (C2) a boron compound of the formula: $G^+(BQ^1Q^2Q^3Q^4)^-$, and (C3) a boron compound of the formula: $(L-H)^+(BQ^1Q^2Q^3Q^4)^-$.

In the boron compound (C1) of the formula: $BQ^1Q^2Q^3$, B is a trivalent boron atom, $Q^1$, $Q^2$ and $Q^3$ represent independently each other a halogen atom, a hydrocarbon group, a halohydrocarbon group, a substituted silyl group, an alkoxy group or a di-substituted amino group, and they may be the same or different. Preferably, $Q^1$, $Q^2$ and $Q^3$ are each a halogen atom, a hydrocarbon group having 1 to 20 carbon atoms, a halohydrocarbon group having 1 to 20 carbon atoms, a substituted silyl group having 1 to 20 carbon atoms, an alkoxy group having 1 to 20 carbon atoms or a di-substituted amino group having 2 to 20 carbon atoms. More preferably, $Q^1$, $Q^2$ and $Q^3$ are each a halogen atom, a hydrocarbon group having 1 to 20 carbon atoms or a halohydrocarbon group having 1 to 20 carbon atoms. Most preferably, $Q^1$, $Q^2$ and $Q^3$ are each a fluorohydrocarbon group having at least one fluorine atom and 1 to 20 carbon atoms, in particular, a fluorinated aryl group having at least one fluorine atom and 6 to 20 carbon atoms.

Specific examples of the compound (C1) include tris (pentafluorophenyl)borane, tris(2,3,5,6-tetrafluorophenyl) borane, tris(2,3,4,5-tetrafluorophenyl)borane, tris(3,4,5-trifluorophenyl)borane, tris(2,3,4-trifluorophenyl)borane, phenylbis(pentafluorophenyl)borane, etc. Among them, tris (pentafluorophenyl)borane is most preferable.

In the boron compound (C2) of the formula: $G^+(BQ^1Q^2Q^3Q^4)^-$, $G^+$ is an organic or inorganic cation, B is a trivalent boron atom, and $Q^1$ to $Q^4$ are the same as $Q^1$ to $Q^3$ in the above compound (C1).

Specific examples of the inorganic cation $G^+$ in the compound of the formula: $G^+(BQ^1Q^2Q^3Q^4)^-$ include ferrocenium cation, alkyl-substituted ferrocenium cation, silver cation, etc., and specific examples of the organic cation $G^+$ include triphenylmethyl cation, etc. Preferably, the cation $G^+$ is carbenium cation, in particular, triphenylmethyl cation.

Examples of the $(BQ^1Q^2Q^3Q^4)^-$ include tetrakis (pentafluorophenyl)borate, tetrakis(2,3,5,6-tetrafluorophenyl)borate, tetrakis(2,3,4,5-tetrafluorophenyl) borate, tetrakis(3,4,5-trifluorophenyl)borate, tetrakis (2,3,4-trifluorophenyl)borate, phenyltris (pentafluorophenyl) borate, tetrakis(3,5-bistrifluoromethylphenyl)borate, etc.

Typical examples of the combination of the cation $G^+$ and the anion $(BQ^1Q^2Q^3Q^4)^-$ include ferrocenium tetrakis (pentafluorophenyl)borate, 1,1'-dimethylferrocenium tetrakis(pentafluorophenyl)borate, silver tetrakis (pentafluorophenyl)borate, triphenylmethyl tetrakis (pentafluorophenyl)borate, triphenylmethyl tetrakis(3,5-bistrifluoromethylphenyl)borate, etc. Among them, triphenylmethyl tetrakis(pentafluorophenyl)borate is most preferable.

In the boron compound (C3) of the formula: $(L-H)^+(BQ^1Q^2Q^3Q^4)^-$, L is a neutral Lewis acid, $(L-H)^+$ is a Brønsted acid, B is a trivalent boron atom, and $Q^1$ to $Q^4$ are the same as $Q^1$ to $Q^3$ in the above compound (C1).

Specific examples of the Brønsted acid $(L-H)^+$ in the compound of the formula: $(L-H)^+(BQ^1Q^2Q^3Q^4)^-$ include trialkyl-substituted ammonium, N,N-dialkylanilinium, dialkylammonium, triarylphosphonium, etc. Examples of the anion $(BQ^1Q^2Q^3Q^4)^-$ are the same as those exemplified above.

Typical examples of the combination of the Brønsted acid $(L-H)^+$ and the anion $(BQ^1Q^2Q^3Q^4)^-$ include triethylammonium tetrakis(pentafluorophenyl)borate, tripropylammonium tetrakis(pentafluorophenyl)borate, tri(n-butyl) ammonium tetrakis(pentafluorophenyl)borate, tri(n-butyl) ammonium tetrakis(3,5-bistrifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis (pentafluorophenyl)borate, N,N-dimethylanilinium tetrakis (3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri (methylphenyl)phosphoniumtetrakis (pentafluorophenyl) borate, tri(dimethylphenyl)phosphonium tetrakis (pentafluorophenyl)borate, etc. Among them, tri(n-butyl) ammonium tetrakis(pentafluorophenyl)borate and N,N-dimethylanilinium tetrakis(pentafluorophenyl)borate are most preferable.

In the copolymerization reaction, a catalyst for olefin polymerization comprising the transition metal complex (A) and one or both of the compound (B) and the compound (C) is used. When a catalyst for olefin polymerization consisting of the compounds (A) and (B) is used, the compound (B) is preferably the cyclic aluminoxane (B2) and/or the linear aluminoxane (B3). Another preferable example of the catalyst for olefin polymerization consists of the compounds (A), (B) and (C). In this case, the compound (B) is preferably the compound (B1).

The used amounts of the component compounds are preferably selected so that a molar ratio of (B) to (A) is from 0.1 to 10,000, preferably from 5 to 2,000, and a molar ratio of (C) to (A) is from 0.01 to 100, preferably from 0.5 to 10.

When each component is used in the form of a solution or a suspension in a solvent, its concentration is arbitrarily selected according to conditions such as the performance of equipment for supplying each component to a polymerization reactor. Desirably, the concentration of the compound (A) is from 0.01 to 500 µmol/g (solvent), preferably from 0.05 to 100 µmol/g, more preferably from 0.05 to 50 µmol/g, the concentration of the compound (B) is usually from 0.01 to 10,000 µmol/g, preferably from 0.1 to 5,000 µmol/g, more preferably from 0.1 to 2,000 µmol/g in terms of aluminum atoms, and the concentration of the compound (C) is usually from 0.01 to 500 µmol/g, preferably from 0.05 to 200 µmol/g, more preferably from 0.05 to 100 µmol/g.

For the preparation of the propylene copolymer, solution polymerization using a solvent such as an aliphatic hydrocarbon (e.g. butane, pentane, hexane, heptane, octane, etc.), an aromatic hydrocarbon (e.g. benzene, toluene, etc.) or a halohydrocarbon (e.g. methylene dichloride, etc.), slurry polymerization, gas-phase polymerization in a gas state monomers, etc. The polymerization process may be a continuous process or a batch process.

A polymerization temperature is usually from −50 to 200° C., preferably from −20 to 100° C. A polymerization pressure is preferably from atmospheric pressure to 60 kg/cm$^2$G. A polymerization time depends on the kind of the catalyst, the type of the reactor, etc., and may be selected from a range between 1 minute and 20 hours. A chain transfer agent such as hydrogen may be added to a reaction system to adjust the molecular weight of the copolymer.

The propylene copolymer of the present invention is suitably used as an additive for a thermoplastic resin. Examples of the thermoplastic resins include polyethylene resins (e.g. high density polyethylene, medium density polyethylene, low density polyetylene, linear low density polyethylene (LLDPE), etc.), polypropylene resins, poly-4-methylpentene-1, polystyrene, polyester, polyamide, polyphenylene ether, and the like. Preferable thermoplastic resins are polyolefin resins, more preferably crystalline polyolefins comprising an olefin having at least 3 carbon atoms as a main component, in particular, crystalline polypropylene resins. Typical examples of the polyolefin resins include high density polyethylene, middle density polyolefin, low density polyolefin, LLDPE, polypropylene resins, poly-4-methylpentene-1, etc. Polypropylene resins are usually crystalline polypropylene resins, and may be a propylene homopolymer or a random or block copolymer of propylene and a small amount of ethylene or an α-olefin.

When the polypropylene resin is a copolymer, the content of ethylene or other α-olefin in the copolymer is 10% by weight or less, preferably from 0.5 to 7% by weight in the case of a random copolymer, or the content of other α-olefin is from 1 to 40% by weight, preferably from 1 to 25% by weight, more preferably from 2 to 20% by weight, in particular from 3 to 15% by weight in the case of a block copolymer. Two or more polypropylene resins may be used in combination.

As an index of the crystallinity of polypropylene, a melting point, heat of crystalline melting, etc. are used. Preferably, a melting point of the crystalline polypropylene is in the range between 120° C. and 176° C., and heat of crystalline melting is in the range between 60 J/g and 120 J/g. When the melting point of the crystal is too low, or the heat of crystalline melting is too small, the material has low heat resistance.

To prepare the polypropylene resin, propylene is homopolyerized to obtain a propylene homopolymer, or propylene and an α-olefin having 2 or 4 to 12 carbon atoms, preferably ethylene are copolymerized to obtain a propylene-α-olefin copolymer by slurry polymerization, gas-phase polymerization, bulk polymerization or solution polymerization or their combination in a single step or multi-step process using a Ziegler-Natta catalyst comprising a titanium-containing solid transition metal component and an organometallic component, or a metallocene catalyst comprising a transition metal compound of a transition metal of the 4A to 6A group of the Periodic Table having at least one cyclopentadienyl moiety and a co-catalyst component. In addition, commercially available polypropylene resins may be used.

The thermoplastic resin composition of the present invention comprises the propylene copolymer of the present invention and the thermoplastic resin. The thermoplastic resin composition of the present invention preferably contains 3 to 95% by weight of the propylene copolymer (a) and 97 to 5% by weight of the thermoplastic resin (b) ((a)+(b)= 100% by weight), more preferably 10 to 90% by weight of the propylene copolymer and 90 to 10% by weight of the thermoplastic resin, in particular 15 to 85% by weight of the propylene copolymer and 85 to 15% by weight of the thermoplastic resin.

When the amount of the propylene copolymer is too large, that is, the amount of the thermoplastic resin is too small, the composition may have low molding processability or insufficient strength. When the amount of the propylene copolymer is too small, that is, the amount of the thermoplastic resin is too large, the composition may have low flexibility or scratch resistance.

Preferably, the surface condition of the thermoplastic resin composition is not deteriorated in the heat test carried out at a temperature lower than the melting point of the thermoplastic resin. Herein, the deterioration of the surface condition means the generation of gloss on a matted surface of a molded sample, and so on.

With the thermoplastic resin composition of the present invention, the change of the gloss value on a surface of a molded sheet before and after the heat test at 110° C. for 100 hours is preferably 1 or less. When the change of the gloss value is more than 1, the gloss due to the propylene copolymer appears on the surface of a molded article made from the thermoplastic resin composition of the present invention, and thus the appearance of the molded article deteriorates.

In addition to the essential components, that is, the propylene copolymer and the thermoplastic resin, the thermoplastic resin composition of the present invention may contain other rubber component, if necessary. Examples of the rubber components include the following rubbers: ethylene-propylene copolymer rubber, ethylene-α-olefin copolymer rubbers comprising, for example, ethylene and 1-butene, ethylene and 1-hexene, or ethylene and 1-octene, ethylene-propylene-non-conjugated diene copolymer rubber, ethylene-α-olefin-non-conjugated diene copolymer rubber, polybutadiene, styrene-butadiene block copolymer rubber, styrene-butadiene-styrene block copolymer rubber, styrene-butadiene random copolymer rubber, partially hydrogenated styrene-butadiene-styrene block copolymer rubber, partially hydrogenated styrene-butadiene random copolymer rubber, styrene-isoprene block copolymer rubber, partially hydrogenated styrene-isoprene copolymer rubber, polyacrylonitrile rubber, acrylonitrile-butadiene copolymer rubber, partially hydrogenated acrylonitrile-butadiene copolymer rubber, butyl rubber, chloroprene rubber, fluororubber, chlorosulfonated polyethylene, silicone rubber, urethane rubber, etc.

If necessary, a crosslinking agent such as a peroxide or sulfur can be added to the thermoplastic resin composition to cross link the composition. Furthermore, the thermoplastic resin composition of the present invention may contain antioxidants, heat stabilizers, UV ray absorbers, lubricants, antistatic agents, pigments, fillers, flame retardants, etc.

Apart from the essential propylene copolymer and polyolefin resin, the thermoplastic resin composition of the present invention may contain other resin component (e.g. rosin resins, polyterpene resin, synthetic petroleum resins, coumarone resins, phenol resins, xylene resins, styrene resins, isoprene resin, cyclic olefin resins, etc.), if necessary.

The thermoplastic resin composition of the present invention can be prepared by melting and kneading the components with, for example, a twin-screw extruder, a Banbury mixer, etc.

The thermoplastic resin composition of the present invention can be molded by any known molding method such as extrusion molding, injection molding, compression molding, blow molding, vacuum molding, powder molding, calender molding, etc. Examples of the powder molding include slush molding, flow-dip molding, electrostatic coating, powder spraying, powder rotational molding, etc.

The thermoplastic resin composition of the present invention is preferably used to produce domestic electric appliances, automobile parts, general merchandises, etc. by making use of its excellent properties. As automobile parts, interior surface materials of instrument panels, doors, pillars, etc. and air-back covers are exemplified.

EXAMPLES

The present invention will be illustrated by the following examples, which will not limit the scope of the present invention.

[1] Measurement of Properties of Propylene Copolymers (1) Intrinsic Viscosity [η]

An intrinsic viscosity was measured using a Ubbellohde viscometer in Tetralin at 135° C. Three hundred grams of a copolymer sample was dissolved in 100 ml of Tetralin to obtain a solution having a concentration of 3 mg/ml. Then, this solution was diluted to decrease the concentration to ½, ⅓ or ⅕, and a viscosity of each solution was measured in a constant temperature vessel kept at 135° C.±0.1° C. At each concentration, the viscosity was measured three times, and the averaged value was used as an intrinsic viscosity.

(2) Molecular Weight Distribution

A molecular weight distribution was measured by a gel permeation chromatography (GPC) method using a 150C/GPC apparatus of Waters, Inc. An elution temperature was 140° C., a used column was Sodex Packed Column A-80M manufactured by SHOWA DENKO Kabushikikaisha, and a standard sample for a molecular weight was polystyrenes, for example, polystyrenes having molecular weights of 68 to 8,400,000 manufactured by TOSOH CORPORATION.

About 5 mg of a polymer was dissolved in 5 ml of o-dichlorobenzene to obtain a solution having a concentration of about 1 mg/ml. The obtained sample solution (400 μl) was injected in the column. A flow rate of an eluting solvent was 1.0 ml/min., and the eluted fractions were detected with a refractive index detector.

Then, a ratio of the measured weight average molecular weight (Mw) to the measured number average molecular weight (Mn), which are both polystyrene-converted molecular weights, was calculated, and used as a molecular weight distribution of the propylene copolymer of the present invention.

(3) Measurement of Heat of Melting and Heat of Crystallization with Differential Scanning Calorimeter (DSC)

DSC 220C of Seiko Electronic Industries, Ltd. was used as a differential scanning calorimeter, and the measurement was carried out at a temperature raising or decreasing rate of 10° C./min.

(4) Contents of Monomer Units in Copolymer Calibration Curve:

Each of mixtures containing a propylene homopolymer and an ethylene-1-butene copolymer at various ratios was heat pressed to mold a film having a thickness of 0.05 mm.

Using an IR spectrometer, an absorbance at a peak due to the propylene units (at a wave number of 1,150 $cm^{-1}$) and that at a peak due to the 1-butene units (at a wave number of 770 $cm^{-1}$) were measured. Then, the contents of the propylene units and 1-butene units in the mixtures were plotted against the absorbances, respectively. A regression curve was obtained from the plots and used as a calibration curve.

The mixtures of the propylene homopolymer and the ethylene-1-butene copolymer were prepared by dissolving the both polymers in toluene, adding methanol to the solutions to precipitate the polymer mixtures, and drying the precipitated polymer mixtures.

Measurements of Contents of Propylene and 1-Butene:

An olefin copolymer was heat pressed to mold a film having a thickness of 0.05 mm, and absorbances at peaks due to propylene units and 1-butene units, respectively were measured with an IR spectrometer. Then, the contents of the propylene units and the 1-butene units were read from the above calibration curve using the measured absorbances.

Measurement of Content of Dicyclopentadiene (DCPD):

An olefin copolymer was heat pressed to mold a film having a thickness of 0.5 mm, and a peak transmittance due to dicyclopentadiene (at a wave number or 1,611 $cm^{-1}$) was measured using an IR spectrometer. Then, the content of dicyclopentadiene in the olefin copolymer was calculated.

Measurement of Content of 5-Ethylidene-2-Norbornene (ENB):

An olefin copolymer was heat pressed to mold a film having a thickness of 0.5 mm, and a peak transmittance due to 5-ethylidene-2-norbornene (at a wave number or 1,650 $cm^{-1}$) was measured using an IR spectrometer. Then, the content of 5-ethylidene-2-norbornene in the olefin copolymer was calculated.

[2] Synthesis of Propylene Copolymers

Example 1

Ethylene, propylene, 1-butene and dicyclopentadiene were continuously copolymerized in a 100 liter SUS polymerization vessel equipped with agitation blades. That is, hexane as a polymerization medium was supplied at a rate of 83 liter/hr. from the lower part of the vessel, while the polymerization liquid was removed from the upper part of the vessel at a rate such that the amount of the polymerization liquid in the vessel was maintained at 100 liters. As a catalyst, dimethylsilyl-(tetramethylcyclopentadienyl)(3-tert.-butyl-5-methyl-2-phenoxy) titanium dichloride represented by the formula described below, triphenylmethyl tetrakis(pentafluorophenyl) borate, and isobutylaluminum (hereinafter referred to as "TIBA") were continuously supplied from the lower part of the vessel at rates of 0.068 g/hr., 2.067 g/hr. and 3.960 g/hr., respectively. The molecular weight was controlled with hydrogen. The copolymerization was carried out at 50° C. while circulating cooling water in a jacket which was attached to the exterior of the vessel.

To the polymerization liquid removed from the vessel, a small amount of ethanol was added to terminate the polymerization, followed by the removal of the monomers and washing with water. Then, the solvent was removed with steam in a large amount of water to recover the copolymer, which was dried under reduced pressure at 80° C. for one day.

By the above procedures, the ethylene-propylene-1-butene-dicyclopentadiene copolymer was obtained at a rate of 2.2 kg/hr.

Dimethylsilyl(tetramethylcyclopentadienyl)(3-tert.-butyl-5-methyl-2-phenoxy)titanium dichloride:

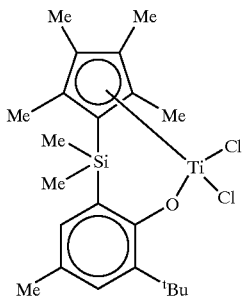

Examples 2–4 and Comparative Examples 1–3

A copolymer was prepared in the same manner as in Example 1 except that the polymerization temperature, the feeding rates of the catalyst components, and the feeding rates of the monomers were changed as shown in Tables 1 and 2.

TABLE 1

|  | Unit | Ex. 1 A-1 | Ex. 2 A-2 | Ex. 3 A-3 | Ex. 4 A-4 |
| --- | --- | --- | --- | --- | --- |
| Polymerization temperature | °C. | 50 | 50 | 45 | 45 |
| Ethylene | kg/h | 2 | 2 | 2.3 | 1.8 |
| Propylene | kg/h | 8.3 | 8.3 | 2.4 | 2.4 |
| 1-Butene | kg/h | 12.7 | 12.7 | 15.2 | 19.0 |
| DCPD[1] | kg/h | 1.04 | 1.04 | 0.75 | 0 |
| ENB[2] | kg/h | 0 | 0 | 0 | 0.60 |
| (a)[3] | g/h | 3.960 | 2.376 | 2.625 | 1.315 |
| (b)[4] | g/h | 2.067 | 0.964 | 1.378 | 0.689 |
| (c)[5] | g/h | 0.068 | 0.068 | 0.046 | 0.023 |
| Ethylene content | mol % | 19 | 19 | 50 | 47 |
| Propylene content | mol % | 37 | 33 | 16 | 13 |
| 1-Butene content | mol % | 43 | 47 | 33 | 39 |
| DCPD content | mol % | 1 | 1 | 1 | 0 |
| ENB content | mol % | 0 | 0 | 0 | 1 |
| Crystalline melting point | °C. | None | None | None | None |
| Heat of crystalline melting | mJ/mg | None | None | None | None |
| Crystallization temperature | °C. | None | None | None | None |
| Heat of crystallization | mJ/mg | None | None | None | None |
| Intrinsic viscosity [η] | dl/g | 0.9 | 0.9 | 0.8 | 0.8 |
| GPC Mw/Mn |  | 2.7 | 3.1 | 2.7 | 2.2 |

Notes:
[1] DCPD: dicyclopentadiene.
[2] EMB: 5-ethylidene-2-norbornene.
[3] (a): triisobutylaluminum.
[4] (b): triphenylmethyl tetrakis(pentafluorophenyl)borate.
[5] (c): dimethylsilyl(tetramethylcyclopentadienyl)(3-tert.-butyl-5-methyl-2-phenoxy)titanium dichloride.

TABLE 2

|  | Unit | C. Ex. 1 A-5 | C. Ex. 2 A-6 | C. Ex. 3 A-7 |
| --- | --- | --- | --- | --- |
| Polymerization temperature | °C. | 50 | 50 | — |
| Ethylene | kg/h | 2 | 2.0 | — |
| Propylene | kg/h | 8.3 | 8.3 | — |
| 1-Butene | kg/h | 12.7 | 12.7 | — |
| DCPD[1] | kg/h | 0 | 0 | — |
| ENB[2] | kg/h | 0 | 0 | — |
| (a)[3] | g/h | 3.960 | 1.584 | — |
| (b)[4] | g/h | 2.067 | 0.276 | — |
| (c)[5] | g/h | 0.068 | 0.018 | — |
| Ethylene content | mol % | 19 | 11 | 59 |
| Propylene content | mol % | 36 | 40 | 39 |
| 1-Butene content | mol % | 45 | 49 | — |
| DCPD content | mol % | 0 | 0 | — |
| ENB content | mol % | 0 | 0 | 2 |
| Crystalline melting point | °C. | None | None | None |
| Heat of crystalline melting | mJ/mg | None | None | None |
| Crystallization temperature | °C. | None | None | None |
| Heat of crystallization | mJ/mg | None | None | None |
| Intrinsic viscosity [η] | dl/g | 1.0 | 1.0 | 1.4 |
| GPC Mw/Mn |  | 2.5 | 2.2 | 3.9 |

Note:
A-7: ESPRENE EPDM E501A manufactured by Sumitomo Chemical Co., Ltd.

[3] Evaluation of Thermoplastic Resin Compositions

Examples 5–11 and Comparative Examples 4–8

Components shown in Tables 3, 4 and 5 of the indicated amounts were kneaded with a twin-screw batch type kneader (LABOPLASTOMILL manufactured by TOYO SEIKI Kabushikikaisha) at 200° C. at a screw revolution rate of 100 rpm for 3 minutes. The obtained composition was pressed at 200° C. to form a sheet having a thickness of 2 mm unless otherwise indicated.

Test specimens for property measurements were stamped out from the pressed sheet.

In Examples 5–11 and Comparative Examples 4–8, the properties of the thermoplastic resin compositions were measured as follows:

(1) Bending Test

The bending test was carried out according to JIS K7203.

(2) Heat Resistance Test

A press molded sheet having a Grain C skin grain design and a thickness of 1 mm (15 cm square) was produced with a press molding machine so that a surface gloss value on the surface having the Grain C skin grain design was 2 or less. The press molding was carried out by melting the thermoplastic resin composition for 5 minutes with upper and lower press plates at 200° C. under a pressure of 5 kg/cm²G, and then cooling it with the same press mold machine (50 kg/cm²G while cooling the upper and lower plates with water).

The sheet was cut to a size of 5 cm×3 cm, and placed in a gear oven (PHH type; manufactured by TABAI), the tank interior temperature of which was maintained at 110° C., for 100 hours with the surface having the skin grain design facing upwards.

Before and after the above test, a surface gloss value on the surface having the skin grain design of the press molded sheet was measured with a varying angle type digital glossmeter (UGV-5DP Type manufactured by SUGA SHIKENKI) with setting both an incident angle and a light-receiving angle at 60 degrees. All the gloss measurements were carried out after cooling the samples to room temperature.

(3) Scratch Resistance Test

Using a surface-property measuring apparatus TRIBOGEAR (manufactured by SHINTO SCIENCE), the surface of a pressed sheet having a thickness of 2 mm was scratched at a constant speed with a scratching needle to which a load of 500 g was applied. Then, the depth of the scratch was measured with a contact-type surface roughness meter SURFCOM (manufactured by Tokyo Seimitsu) in the order of micrometers.

(4) Tensile Test

Using a No. 1 dumbbell shape test piece defined in JIS K6301, the tensile test was carried out at a pulling rate of 200 mm/min.

(5) Haze

A haze was measured with a pressed sheet having a thickness of 2 mm according to JIS K7105.

(6) Resistance to Whitening on Bending

A molded article having a thickness of 1 mm was cut to a size of 1 cm×5 cm, and the degree of whitening was observed with an eye when the test piece was bent at an angle of 180 degrees, and evaluated according to the following criteria:

1: Whitened: Ranked X
2: No whitening: Ranked ○

The results are summarized in Tables 3, 4 and 5.

The thermoplastic resin compositions comprising the propylene copolymers of Examples which satisfy the requirements of the present invention had a low flexural modulus, suffered from nether whitening on bending nor marks of deep scratch, and had high transparency. Furthermore, they had high heat resistance so that no deterioration of the surface properties were observed after the heat test.

TABLE 3

| Copolymer | Unit | Ex. 5 | Ex. 6 | Ex. 7 | Ex. 8 |
|---|---|---|---|---|---|
| A-1 | wt. % | 35.3 | — | — | — |
| A-2 | wt. % | — | 80 | 65 | 50 |
| B | wt. % | 64.7 | — | — | — |
| C | wt. % | — | 20 | 35 | 50 |
| D | wt. % | 0.1 | 0.1 | 0.1 | 0.1 |
| E | wt. % | 1 | 1 | 1 | 1 |
| Flexural modulus | kgf/cm² (MPa) | 3644 (357) | 31 (3) | 147 (14) | 541 (53) |
| Depth of scratch (500 g load) | μm | 53 | — | — | 53 |
| Gloss | | | | | |
| −0 hour | | 0.6 | 1.0 | 1.0 | 0.7 |
| −100 hours | | 0.3 | 1.0 | 0.9 | 0.4 |
| Δgloss | | 0.3 | 0.0 | 0.1 | 0.3 |
| Tensile strength | MPa | 19.4 | 0.9 | 4.4 | 9.8 |
| Tensile elongation | % | 890 | 2060 | 1130 | 1140 |
| Resistance to whitening on bending | | ○ | ○ | ○ | ○ |
| Haze[1] (2 mm thickness) | % | — | — | — | — |

Notes:
B: Propylene homopolymer having MI of 14 (g/10 min.) at 230° C. under a load of 2.16 kg.
C: An ethylene-propylene random copolymer (ethylene content of 5 wt. %) having MI of 228 (g/10 min.) at 230° C. under a load of 2.16 kg.
D: IRGANOX 1010 (manufactured by Ciba-Geigy).
E: DRY COLOR PV-801 (manufactured by SUMIKA COLOR Co., Ltd.).
[1]The haze was measured with samples containing no component E (DRY COLOR PV-801).

TABLE 4

| Copolymer | Unit | Ex. 9 | Ex. 10 | Ex. 11 |
|---|---|---|---|---|
| A-2 | wt. % | 40 | — | — |
| A-3 | wt. % | — | 50 | — |
| A-4 | wt. % | — | — | 50 |
| B | wt. % | — | — | — |
| C | wt. % | 60 | 50 | 50 |
| D | wt. % | 0.1 | 0.1 | 0.1 |

TABLE 4-continued

| Copolymer | Unit | Ex. 9 | Ex. 10 | Ex. 11 |
|---|---|---|---|---|
| E | wt. % | 1 | 1 | 1 |
| Flexural modulus | kgf/cm² (MPa) | 1113 (109) | 496 (49) | 483 (47) |
| Depth of scratch (500 g load) | μm | — | 76 | 81 |
| Gloss | | | | |
| −0 hour | | 1.0 | 0.8 | 0.8 |
| −100 hours | | 0.4 | 0.9 | 0.9 |
| Δgloss | | 0.6 | 0.1 | 0.1 |
| Tensile strength | MPa | 12.8 | 8.2 | 8.1 |
| Tensile elongation | % | 1020 | 850 | 890 |
| Resistance to whitening on bending | | ○ | ○ | ○ |
| Haze[1] (2 mm thickness) | % | — | 70 | 60 |

Note:
[1]The haze was measured with samples containing no component E (DRY COLOR PV-801).

TABLE 5

| Copolymer | Unit | C. Ex. 4 | C. Ex. 5 | C. Ex. 6 | C. Ex. 7 | C. Ex. 8 |
|---|---|---|---|---|---|---|
| A-5 | wt. % | 35.3 | — | — | — | — |
| A-6 | wt. % | — | 50 | — | — | — |
| A-7 | wt. % | — | — | 50 | — | — |
| B | wt. % | 64.7 | — | — | 100 | — |
| C | wt. % | — | 50 | 50 | — | 100 |
| D | wt. % | 0.1 | 0.1 | 0.1 | — | — |
| E | wt. % | 1 | 1 | 1 | — | — |
| Flexural modulus | kgf/cm² (MPa) | 3378 (331) | 557 (55) | 602 (59) | 13340 (1307) | 6827 (669) |
| Depth of scratch (500 g load) | μm | 62 | 66 | 189 | — | — |
| Gloss | | | | | | |
| −0 hour | | 0.6 | 0.8 | 0.5 | — | — |
| −100 hours | | 9.3 | 4.3 | 0.5 | — | — |
| Δgloss | | 8.7 | 3.5 | 0.0 | — | — |
| Tensile strength | MPa | 15.6 | 7.1 | 4.0 | 40.1 | 16.9 |
| Tensile elongation | % | 610 | 720 | 25 | 10 | 340 |
| Resistance to whitening on bending | | ○ | ○ | X | X | X |
| Haze[1] (2 mm thickness) | % | — | — | 93 | 87 | 87 |

Note:
[1]The haze was measured with samples containing no component E (DRY COLOR PV-801).

EFFECTS OF THE INVENTION

As explained above, the propylene copolymer of the present invention is mixed with a resin such as polypropylene to provide a thermoplastic resin composition having excellent flexibility, transparency, resistance to whitening on bending, scratch resistance and heat resistance.

What is claimed is:

1. A propylene copolymer comprising propylene, at least one olefin selected from the group consisting of olefins having 2 to 20 carbon atoms except propylene, and a cyclic olefin, wherein the total number of carbon atoms of the monomers except the cyclic olefin is at least 7, and said propylene copolymer contains 50% by mole or less of ethylene.

2. The propylene copolymer according to claim 1, wherein a content of said cyclic olefin is from 0.01 to 20% by mole.

3. The propylene copolymer according to claim 1, wherein said cyclic olefin is a cyclic monoolefin.

4. The propylene copolymer according to claim 1, wherein said cyclic olefin is a cyclic polyene.

5. A propylene copolymer comprising propylene, at least one olefin selected from the group consisting of olefins having 2 to 20 carbon atoms except propylene, and a cyclic olefin, wherein the total number of carbon atoms of the monomers except the cyclic olefin is at least 7, and a content of an olefin having 2 carbon atoms is 80% by mole or less.

6. The propylene copolymer according to claim 1, which satisfies the following relationship:

$$[y/(x+y)] \geq 0.2$$

wherein x is a molar content of an olefin having 2 carbon atoms in the copolymer, and y is a molar content of olefins having 4 to 20 carbon atoms in the copolymer.

7. The propylene copolymer according to claim 1, which has an intrinsic viscosity [η] of from 0.3 to 10 when measured in tetrahydronaphthalene at 135° C.

8. The propylene copolymer according to claim 1, which has a molecular weight distribution (Mw/Mn) of 5 or less, when measured by gel permeation chromatography (GPC).

9. The propylene copolymer according to claim 1, which has neither a peak of 1 J/g or more due to the melting of crystals nor a peak of 1 J/g or more due to crystallization, in a measurement with a differential scanning calorimeter (DSC).

10. The propylene copolymer according to claim 1, which is obtained by copolymerizing propylene, at least one olefin selected from the group consisting of olefins having 2 to 20 carbon atoms except propylene, and a cyclic olefin in the presence of an olefin-polymerization catalyst comprising the following component (A), and one or both of the following components (B) and (C):

(A) at least one transition metal complex selected from the group consisting of the compounds represented by the following formulas [I], [II] and [III]:

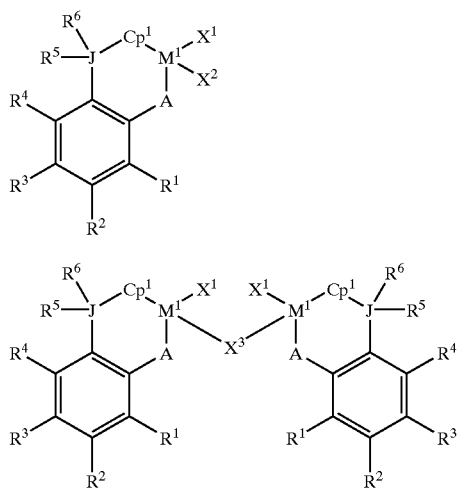

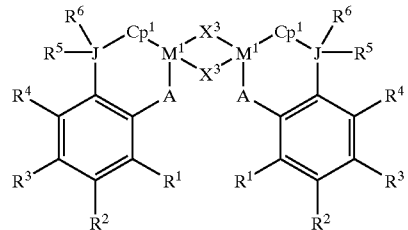

wherein $M^1$ is a transition metal element of the group 4 of the Periodic Table, A is an element of the 16 group of the Periodic Table, J is an element of the group 14 of the Periodic Table; $Cp^1$ is a cyclopentadienyl anionic moiety; $X^1$, $X^2$, $R^1$, $R^2$, $R^3$, $R^4$, $R^5$ and $R^6$ represent independently of each other a hydrogen atom, a halogen atom, an alkyl group, an aralkyl group, an aryl group, a substituted silyl group, an alkoxy group, an aralkyloxy group, an aryloxy group or a di-substituted amino group, provided that $R^1$, $R^2$, $R^3$, $R^4$, $R^5$ and $R^6$ may optionally be bonded to form a ring; and $X^3$ is an element of the group 16 of the Periodic Table; provided that two $M^1$, A, J, $Cp^1$, $X^1$, $X^2$, $X^3$, $R^1$, $R^2$, $R^3$, $R^4$, $R^5$ or $R^6$ in the formula [I] or [II] may be the same or different, (B) at least one aluminum compound selected from the group consisting of the following compounds (B1), (B2) and (B3):

(B1) an organic aluminum compound of the formula:

(B2) a cyclic aluminoxane of the formula:

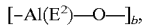

and (B3) a linear aluminoxane of the formula:

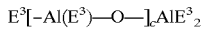

wherein $E^1$, $E^2$ and $E^3$ represent independently of each other a hydrocarbon group, provided that all $E^1$'s, all $E^2$'s and all $E^3$'s may be the same or different; Z is a hydrogen atom or a halogen atom, provided that all Z's may be the same or different; a is a number which satisfies the formula: $0 < a \leq 3$, b is an integer of 2 or more; and c is an integer of 1 or more, (C) at least one boron compound selected from the group consisting of the following compounds (C1), (C2) and (C3):

(C1) a boron compound of the formula: $BQ^1Q^2Q^3$, (C2) a boron compound of the formula: $G^+(BQ^1Q^2Q^3Q^4)^-$, and (C3) a boron compound of the formula: $(L-H)^+(BQ^1Q^2Q^3Q^4)^-$ wherein B is a trivalent boron atom, $Q^1$, $Q^2$, $Q^3$ and $Q^4$ represent independently of each other a halogen atom, a hydrocarbon group, a halohydrocarbon group, a substituted silyl group, an alkoxy group or a di-substituted amino group, $G^+$ is an organic or inorganic cation, L is a neutral Lewis base, $(L-H)^+$ is a Brønsted acid.

11. The propylene copolymer according to claim 10, wherein A in the formula [I], [II] or [III] is an oxygen atom.

12. The propylene copolymer according to claim 10, wherein $X^3$ in the formula [II] or [III] is an oxygen atom.

13. The propylene copolymer according to claim 10, wherein $R^1$ in the formula [I], [II] or [III] is an alkyl group, an aralkyl group, an aryl group or a substituted silyl group.

14. The propylene copolymer according to claim 10, wherein $X^1$ and $X^2$ in the formula [I], [II] or [III] represent independently of each other a halogen atom, an alkyl group, an aralkyl group, an alkoxy group, an aryloxy group or di-substituted amino group.

15. The propylene copolymer according to claim 10, wherein said compound (B) is triethylaluminum, triisobutylaluminum or methylaluminoxane.

16. The propylene copolymer according to claim 10, wherein said compound (C) is dimethylanilinium tetrakis (pentafluorophenyl)borate or triphenylmethyl tetrakis (penta-fluorophenyl)borate.

17. An additive for a thermoplastic resin composition comprising a propylene copolymer as claimed in claim 1.

18. A thermoplastic resin composition comprising a thermoplastic resin and a propylene copolymer as claimed in claim 1.

19. The thermoplastic resin composition according to claim 18, wherein a change of a gloss value on a surface of a molded sheet of said resin composition before and after a heat test at 110° C. for 100 hours is 1 or less.

20. The thermoplastic resin composition according to claim 18, wherein said thermoplastic resin is a polyolefin resin.

21. The thermoplastic resin composition according to claim 20, wherein said thermoplastic resin is crystalline polyolefin comprising an olefin having at least 3 carbon atoms.

22. The thermoplastic resin composition according to claim 21, wherein said thermoplastic resin is a crystalline polyolefin-resin.

* * * * *

UNITED STATES PATENT AND TRADEMARK OFFICE
CERTIFICATE OF CORRECTION

PATENT NO.   : 6,458,901 B1
DATED        : October 1, 2002
INVENTOR(S)  : Keisaku Yamamoto et al.

It is certified that error appears in the above-identified patent and that said Letters Patent is hereby corrected as shown below:

<u>Title page,</u>
Item [30], Foreign Application Priority Data, please correct the Japanese priority date from "Dec. 11, 1997" to -- Nov. 12, 1997 --.

Signed and Sealed this

Eighth Day of July, 2003

JAMES E. ROGAN
*Director of the United States Patent and Trademark Office*